US011163969B2

(12) United States Patent
Wang et al.

(10) Patent No.: US 11,163,969 B2
(45) Date of Patent: Nov. 2, 2021

(54) FINGERPRINT RECOGNITION METHOD AND APPARATUS, AND MOBILE TERMINAL

(71) Applicant: Huawei Technologies Co., Ltd., Guangdong (CN)

(72) Inventors: Chan Wang, Shenzhen (CN); Huangwei Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 15/509,616

(22) PCT Filed: Sep. 9, 2014

(86) PCT No.: PCT/CN2014/086148
§ 371 (c)(1),
(2) Date: Mar. 8, 2017

(87) PCT Pub. No.: WO2016/037318
PCT Pub. Date: Mar. 17, 2016

(65) Prior Publication Data
US 2017/0308732 A1 Oct. 26, 2017

(51) Int. Cl.
*G06K 9/00* (2006.01)
*G06F 3/0488* (2013.01)
(Continued)

(52) U.S. Cl.
CPC ....... *G06K 9/00013* (2013.01); *G06F 3/0488* (2013.01); *G06F 3/04886* (2013.01);
(Continued)

(58) Field of Classification Search
CPC ........... G06K 9/00013; G06K 9/00087; G06K 9/2081; G06F 3/0488; G06F 3/04886; G06F 21/32
(Continued)

(56) References Cited

U.S. PATENT DOCUMENTS 5,933,134 A * 8/1999 Shieh .................... G06F 3/0488
345/157
6,067,079 A * 5/2000 Shieh .................... G06F 3/0488
345/156
(Continued)

FOREIGN PATENT DOCUMENTS

CN 101833651 A 9/2010
CN 102917023 A 2/2013
(Continued)

*Primary Examiner* — Jonathan S Lee
(74) *Attorney, Agent, or Firm* — Maier & Maier, PLLC

(57) ABSTRACT

The present disclosure discloses a fingerprint recognition method and apparatus, and a mobile terminal, which are related to the field of information recognition technologies, and are used to reduce power consumption of the mobile terminal while implementing timely fingerprint collection. According to embodiments of the present disclosure, the mobile terminal determines a first fingerprint recognition area of a touchscreen according to a first user interface, and detects a touch operation of a user on the touchscreen; activates a fingerprint recognition function of the first fingerprint recognition area when a touch position corresponding to the touch operation is located in the first fingerprint recognition area, and obtains corresponding first fingerprint information according to the touch operation; and executes at least one function when the first fingerprint information matches preset fingerprint information.

12 Claims, 16 Drawing Sheets

(51) Int. Cl.
*G06F 21/32* (2013.01)
*G06K 9/20* (2006.01)

(52) U.S. Cl.
CPC ......... *G06F 21/32* (2013.01); *G06K 9/00087* (2013.01); *G06K 9/2081* (2013.01)

(58) Field of Classification Search
USPC .......................................................... 382/123
See application file for complete search history.

(56) References Cited

U.S. PATENT DOCUMENTS

| | | | |
|---|---|---|---|
| 7,697,729 B2* | 4/2010 | Howell | G06K 9/00013 345/156 |
| 9,633,558 B2* | 4/2017 | Wang | G08C 19/00 |
| 9,665,762 B2* | 5/2017 | Thompson | G06K 9/00013 |
| 2006/0284853 A1 | 12/2006 | Shapiro | |
| 2009/0058598 A1 | 3/2009 | Sanchez Sanchez et al. | |
| 2010/0231356 A1 | 9/2010 | Kim | |
| 2014/0115725 A1 | 4/2014 | Seo et al. | |
| 2014/0160035 A1* | 6/2014 | Sauer | G06F 3/041 345/173 |
| 2014/0354556 A1* | 12/2014 | Alameh | G06F 21/32 345/173 |
| 2014/0359756 A1* | 12/2014 | Alameh et al. | |
| 2015/0137938 A1* | 5/2015 | Slaby | G07C 9/00079 340/5.53 |
| 2016/0063230 A1* | 3/2016 | Alten | G06F 21/32 726/28 |
| 2017/0083739 A1* | 3/2017 | Chin | G06K 9/00013 |
| 2017/0132449 A1* | 5/2017 | Jiang | G06K 9/4604 |
| 2017/0293750 A1* | 10/2017 | Lee | G06K 9/00013 |
| 2018/0144111 A1* | 5/2018 | Katingari | G06F 3/0416 |
| 2018/0196990 A1* | 7/2018 | Xu | G06K 9/00087 |
| 2018/0260545 A1* | 9/2018 | Chen | G06F 3/0488 |
| 2019/0266374 A1* | 8/2019 | Lee | G06F 3/04883 |

FOREIGN PATENT DOCUMENTS

| | | |
|---|---|---|
| CN | 103176727 A | 6/2013 |
| CN | 103685232 A | 3/2014 |
| CN | 103902865 A | 7/2014 |
| EP | 0593386 A2 | 4/1994 |
| JP | 2010243613 A | 10/2010 |
| WO | 2013022431 A1 | 2/2013 |

* cited by examiner

FINGERPRINT RECOGNITION METHOD AND APPARATUS, AND MOBILE TERMINAL

CROSS-REFERENCE TO RELATED APPLICATIONS

The present application claims priority under 35 U.S.C. § 365 to International Patent Application No. PCT/CN2014/086148 filed Sep. 9, 2014 which is incorporated herein by reference into the present disclosure as if fully set forth herein.

TECHNICAL FIELD

The present invention relates to the field of information recognition technologies, and in particular, to a fingerprint recognition method and apparatus, and a mobile terminal.

BACKGROUND

Nowadays, with continuous development of information recognition technologies, fingerprint recognition, as one of the information recognition technologies, is gradually and widely applied to various mobile terminals, to meet a requirement of people for individual privacy protection. In an existing mobile terminal-based fingerprint recognition technology, a fingerprint is collected by using a fingerprint collection module that is used to collect a fingerprint in a mobile terminal, and the collected fingerprint is stored in a storage module of the mobile terminal.

Generally, in the existing mobile terminal-based fingerprint recognition technology, for collecting a fingerprint in time, a fingerprint recognition function needs to be always enabled in a power-on state of the mobile terminal, that is, the mobile terminal continuously supplies power to the fingerprint collection module. However, continuously supplying power to the fingerprint collection module by the mobile terminal to collect a fingerprint in time leads to an increase of power consumption of the mobile terminal.

SUMMARY

Embodiments of the present invention provide a fingerprint recognition method and apparatus, and a mobile terminal, which are used to resolve a problem of how to reduce power consumption of the mobile terminal while implementing timely fingerprint collection.

According to a first aspect, an embodiment of the present invention provides a fingerprint recognition method, including:

determining a first fingerprint recognition area of a touchscreen according to a first user interface, where the first fingerprint recognition area is corresponding to at least one object of the first user interface, and the at least one object is corresponding to at least one function;

detecting a touch operation of a user on the touchscreen;

determining whether a touch position corresponding to the touch operation is located in the first fingerprint recognition area;

activating a fingerprint recognition function of the first fingerprint recognition area when the touch position corresponding to the touch operation is located in the first fingerprint recognition area, and obtaining corresponding first fingerprint information according to the touch operation; and executing the at least one function when the first fingerprint information matches preset fingerprint information.

In a first possible embodiment, with reference to the first aspect, the at least one object is a first control of a first application program.

In a second possible embodiment, with reference to the first possible embodiment of the first aspect, the determining a first fingerprint recognition area of a touchscreen according to a first user interface includes:

determining the first fingerprint recognition area corresponding to the first control according to a first user interface of the first application program, where the first user interface is an interface that displays at least the first control.

In a third possible embodiment, with reference to the first aspect or either of the foregoing possible embodiments of the first aspect, before the determining a first fingerprint recognition area of a touchscreen according to a first user interface, the method further includes:

receiving user input, where the user input is used to set fingerprint recognition for the at least one function corresponding to the first control.

In a fourth possible embodiment, with reference to the first aspect or the first possible embodiment of the first aspect, the determining a first fingerprint recognition area of a touchscreen according to a first user interface includes:

determining a first fingerprint recognition area corresponding to the first control according to a type of the first control, where the type is a type that requires fingerprint recognition.

In a fifth possible embodiment, with reference to any one of the first to the fourth possible embodiments of the first aspect, the first application program is a desktop management application program, the first control is an identifier of a second application program, and the at least one function is to start the second application program.

In a sixth possible embodiment, with reference to any one of the first to the fourth possible embodiments of the first aspect, the first application program is a non-desktop management application program, the first control is any button of the non-desktop management application program, and the at least one function is to start a function corresponding to the any button.

In a seventh possible embodiment, with reference to the third possible embodiment of the first aspect, after the receiving user input, the method further includes:

adding a specific identifier to the first control, where the specific identifier is used to indicate that fingerprint recognition needs to be performed to execute the at least one function.

In an eighth possible embodiment, with reference to the first aspect or any one of the foregoing possible embodiments of the first aspect, after the activating a fingerprint recognition function of the first fingerprint recognition area when the touch position corresponding to the touch operation is located in the first fingerprint recognition area, and obtaining corresponding first fingerprint information according to the touch operation, the method further includes:

verifying whether the first fingerprint information matches the preset fingerprint information; and disabling the fingerprint recognition function when it is verified that the first fingerprint information matches the preset fingerprint information.

In a ninth possible embodiment, with reference to the eighth possible embodiment of the first aspect, after the verifying whether the first fingerprint information matches the preset fingerprint information, the method further includes:

disabling the fingerprint recognition function when it is verified that the first fingerprint information does not match the preset fingerprint information, and no user fingerprint information is detected in a first predetermined time; or disabling the fingerprint recognition function when it is verified that the first fingerprint information does not match the preset fingerprint information, and the any user fingerprint information detected in a second predetermined time is inconsistent with the preset fingerprint information; or disabling the fingerprint recognition function when it is verified that the first fingerprint information does not match the preset fingerprint information, and a quantity of verification errors exceeds a quantity threshold; or disabling the fingerprint recognition function when it is verified that the first fingerprint information does not match the preset fingerprint information and it is detected that the user touches a non-fingerprint recognition area, where the non-fingerprint recognition area is an area except the first fingerprint recognition area.

According to a second aspect, an embodiment of the present invention provides a fingerprint recognition apparatus, including:

a determining module, configured to determine a first fingerprint recognition area of a touchscreen according to a first user interface, where the first fingerprint recognition area is corresponding to at least one object of the first user interface, and the at least one object is corresponding to at least one function;

a detection module, configured to detect whether a touch position corresponding to the touch operation is located in the first fingerprint recognition area;

an activation module, configured to activate a fingerprint recognition function of the first fingerprint recognition area when the touch position corresponding to the touch operation is located in the first fingerprint recognition area;

an obtaining module, configured to, after the activation module activates the fingerprint recognition function, obtain corresponding first fingerprint information according to the touch operation, and provide the first fingerprint information to an execution module; and the execution module, configured to execute the at least one function when the first fingerprint information matches preset fingerprint information.

In a first possible embodiment, with reference to the second aspect, the at least one object is a first control of a first application program.

In a second possible embodiment, with reference to the first possible embodiment of the second aspect, the determining module is further configured to determine the first fingerprint recognition area corresponding to the first control according to a first user interface of the first application program, where the first user interface is an interface that displays at least the first control.

In a third possible embodiment, with reference to the second aspect or either of the foregoing possible embodiments of the second aspect, the apparatus further includes a receiving module;

the receiving module is configured to receive user input, where the user input is used to set fingerprint recognition for the at least one function of the first control.

In a fourth possible embodiment, with reference to the second aspect or the first possible embodiment of the second aspect, the determining module is further configured to determine a first fingerprint recognition area corresponding to the first control according to a type of the first control, where the type is a type that requires fingerprint recognition.

In a fifth possible embodiment, with reference to any one of the first to the fourth possible embodiments of the second aspect, the first application program is a desktop management application program, the first control is an identifier of a second application program, and the at least one function is to start the second application program.

In a sixth possible embodiment, with reference to any one of the first to the fourth possible embodiments of the second aspect, the first application program is a non-desktop management application program, the first control is any button of the non-desktop management application program, and the at least one function is to start a function corresponding to the any button.

In a seventh possible embodiment, with reference to the third possible embodiment of the second aspect, the apparatus further includes: an adding module;

the adding module is configured to add a specific identifier to the first control, where the specific identifier is used to indicate that fingerprint recognition needs to be performed to execute the at least one function.

In an eighth possible embodiment, with reference to the second aspect or any one of the foregoing possible embodiments of the second aspect, the apparatus further includes: a verification module and a disabling module;

the verification module is configured to verify whether the first fingerprint information matches the preset fingerprint information; and the disabling module is configured to disable the fingerprint recognition function when it is verified that the first fingerprint information matches the preset fingerprint information.

In a ninth possible embodiment, with reference to the eighth possible embodiment of the second aspect, the disabling module is further configured to disable the fingerprint recognition function when it is verified that the first fingerprint information does not match the preset fingerprint information, and no user fingerprint information is detected in a first predetermined time; or, disable the fingerprint recognition function when it is verified that the first fingerprint information does not match the preset fingerprint information, and the any user fingerprint information detected in a second predetermined time is inconsistent with the preset fingerprint information; or, disable the fingerprint recognition function when it is verified that the first fingerprint information does not match the preset fingerprint information, and a quantity of verification errors exceeds a quantity threshold; or, disable the fingerprint recognition function when it is verified that the first fingerprint information does not match the preset fingerprint information and it is detected that the user touches a non-fingerprint recognition area, where the non-fingerprint recognition area is an area except the first fingerprint recognition area.

According to a third aspect, an embodiment of the present invention provides a mobile terminal, including:

a memory, configured to store information including a program instruction;

a processor, coupled with the memory, configured to control execution of the program instruction, and specifically configured to: determine a first fingerprint recognition area of a touchscreen according to a first user interface, where the first fingerprint recognition area is corresponding to at least one object of the first user interface, and the at least one object is corresponding to at least one function; detect a touch operation of a user on the touchscreen; determine whether a touch position corresponding to the touch operation is located in the first fingerprint recognition area; activate a fingerprint recognition function of the first fingerprint recognition area when the touch position corresponding to the touch operation is located in the first fingerprint recognition area, and obtain corresponding first fingerprint information according to the touch operation; and execute the at least one function when the first fingerprint information matches preset fingerprint information.

In a first possible embodiment, with reference to the third aspect, the at least one object is a first control of a first application program.

In a second possible embodiment, with reference to the first possible embodiment of the third aspect, the processor is specifically configured to determine the first fingerprint recognition area corresponding to the first control according to a first user interface of the first application program, where the first user interface is an interface that displays at least the first control.

In a third possible embodiment, with reference to the third aspect or either of the foregoing possible embodiments of the second aspect, the apparatus further includes a receiver;

the receiver is configured to receive user input, where the user input is used to set fingerprint recognition for the at least one function of the first control.

In a fourth possible embodiment, with reference to the third aspect or the first possible embodiment of the third aspect, the processor is further configured to determine a first fingerprint recognition area corresponding to the first control according to a type of the first control, where the type is a type that requires fingerprint recognition.

In a fifth possible embodiment, with reference to any one of the first to the fourth possible embodiments of the third aspect, the first application program is a desktop management application program, the first control is an identifier of a second application program, and the at least one function is to start the second application program.

In a sixth possible embodiment, with reference to any one of the first to the fourth possible embodiments of the third aspect, the first application program is a non-desktop management application program, the first control is any button of the non-desktop management application program, and the at least one function is to start a function corresponding to the any button.

In a seventh possible embodiment, with reference to the third possible embodiment of the third aspect, the processor is further configured to add a specific identifier to the first control, where the specific identifier is used to indicate that fingerprint recognition needs to be performed to execute the at least one function.

In an eighth possible embodiment, with reference to the third aspect or any one of the foregoing possible embodiments of the third aspect, the processor is further configured to verify whether the first fingerprint information matches the preset fingerprint information; and disable the fingerprint recognition function when it is verified that the first fingerprint information matches the preset fingerprint information.

In a ninth possible embodiment, with reference to the eighth possible embodiment of the third aspect, the processor is further configured to disable the fingerprint recognition function when it is verified that the first fingerprint information does not match the preset fingerprint information, and no user fingerprint information is detected in a first predetermined time; or, disable the fingerprint recognition function when it is verified that the first fingerprint information does not match the preset fingerprint information, and the any user fingerprint information detected in a second predetermined time is inconsistent with the preset fingerprint information; or, disable the fingerprint recognition function when it is verified that the first fingerprint information does not match the preset fingerprint information, and a quantity of verification errors exceeds a quantity threshold; or, disable the fingerprint recognition function when it is verified that the first fingerprint information does not match the preset fingerprint information and it is detected that the user touches a non-fingerprint recognition area, where the non-fingerprint recognition area is an area except the first fingerprint recognition area.

Comparing with a problem in a mobile terminal-based fingerprint recognition technology in the prior art that power consumption of a mobile terminal increases because when the mobile terminal is in a power-on state, the mobile terminal needs to always supply power to a fingerprint collection module for timely fingerprint collection, according to the fingerprint recognition method and apparatus, and the mobile terminal provided in the embodiments of the present invention, in the present invention, the mobile terminal determines a first fingerprint recognition area of a touchscreen according to a first user interface, and detects a touch operation of a user on the touchscreen. When a touch position corresponding to the touch operation is located in the first fingerprint recognition area, the mobile terminal activates a fingerprint recognition function of the first fingerprint recognition area and obtains corresponding first fingerprint information according to the touch operation; and executes at least one function when the first fingerprint information matches preset fingerprint information. This implements that the fingerprint recognition function (that is, the fingerprint collection module corresponding to the fingerprint recognition function) is enabled when the touch operation entered by the user on the touchscreen is located in the first fingerprint recognition area, and then a fingerprint entered by the user is collected, thereby implementing timely fingerprint collection while reducing power consumption of the mobile terminal.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
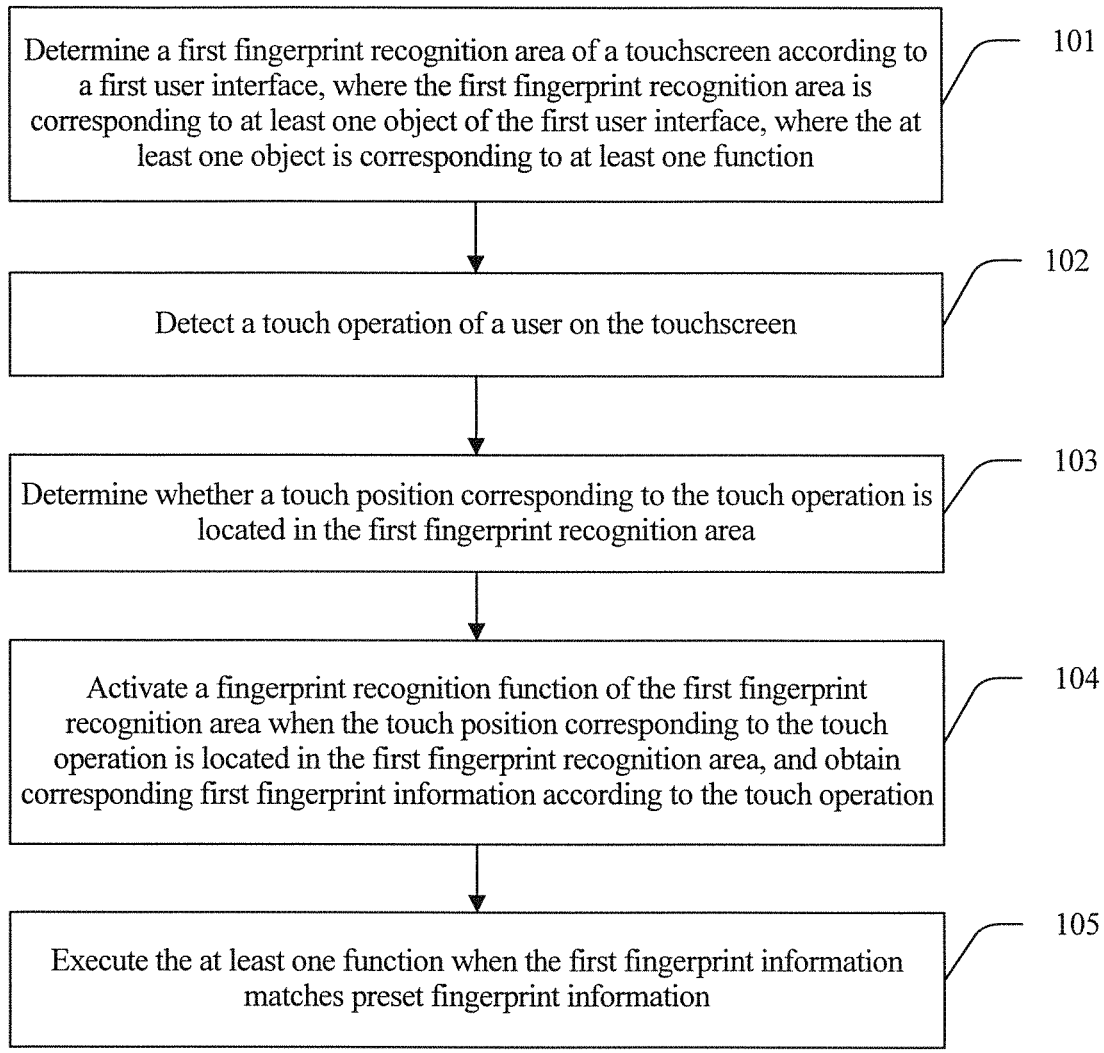
FIG. 1 is a flowchart of a fingerprint recognition method according to an embodiment of the present invention.

As shown in FIG. 1, an embodiment of the present invention provides a fingerprint recognition method, which is applied to a mobile terminal. The method includes:

101. Determine a first fingerprint recognition area of a touchscreen according to a first user interface, where the first fingerprint recognition area is corresponding to at least one object of the first user interface, where the at least one object is corresponding to at least one function.

102. Detect a touch operation of a user on the touchscreen.

The touch operation of the user may be a tap operation, a double-tap operation, a tap-and-hold-screen operation, a slide-screen operation, a drag-icon operation, and the like. Correspondingly, when the mobile terminal identifies that the user touches the screen once, and a touch time is shorter than a predetermined time, it is determined that the touch operation is the tap operation. When the user touches the screen twice, and a time of each touch is shorter than the predetermined time, it is determined that the touch operation is the double-tap operation. When a touch time for which the user touches the screen is longer than or equal to the predetermined time, and a touch trace is detected, it is determined that the touch operation is the slide-screen operation. When a touch time for which the user touches the screen is longer than the predetermined time, a touch trace is detected, and a moving trace of an icon is the same as the touch trace, it is determined that the touch operation is the drag-icon operation. Certainly, a method for determining the touch operation of the user by the mobile terminal is not limited to the foregoing described several operations.

103. Determine whether a touch position corresponding to the touch operation is located in the first fingerprint recognition area.

104. Activate a fingerprint recognition function of the first fingerprint recognition area when the touch position corresponding to the touch operation is located in the first fingerprint recognition area, and obtain corresponding first fingerprint information according to the touch operation.

105. Execute the at least one function when the first fingerprint information matches preset fingerprint information.

Comparing with a problem in a mobile terminal-based fingerprint recognition technology in the prior art that power consumption of a mobile terminal increases because when the mobile terminal is in a power-on state, the mobile terminal needs to always supply power to a fingerprint collection module for timely fingerprint collection, according to the fingerprint recognition method provided in this embodiment of the present invention, in the present invention, the mobile terminal determines a first fingerprint recognition area of a touchscreen according to a first user interface, and detects a touch operation of a user on the touchscreen. When a touch position corresponding to the touch operation is located in the first fingerprint recognition area, the mobile terminal activates a fingerprint recognition function of the first fingerprint recognition area and obtains corresponding first fingerprint information according to the touch operation; and executes at least one function when the first fingerprint information matches preset fingerprint information. This implements that the fingerprint recognition function (that is, the fingerprint collection module corresponding to the fingerprint recognition function) is enabled when the touch operation entered by the user on the touchscreen is located in the first fingerprint recognition area, and then a fingerprint entered by the user is collected, thereby implementing timely fingerprint collection while reducing power consumption of the mobile terminal.

Further, in step 101, the at least one object is a first control of a first application program.

Specifically, when the first application program is a desktop management application program, the first control is an identifier of a second application program, and the at least one function is to start the second application program.

The second application program is a private application program that requires fingerprint recognition. The identifier of the second application program may be an application name, an icon, an application version number, an application installation package name, or the like of the application program.

When the first application program is a non-desktop management application program, the first control is any button of the non-desktop management application program, and the at least one function is to start a function corresponding to the any button.

The desktop management application program is used to manage all application programs on the desktop. The any button of the non-desktop management application program generally appears in a dialog box or in a toolbar, and is used for interaction between the user and an application program corresponding to the internal control. The user may enter data or execute a function by using the any button of the non-desktop management application program. When the function corresponding to the any button is to be enabled, fingerprint recognition needs to be performed.

The function in this step generally refers to a function for using the application program, such as an enabling function, a login function, and a payment function.

Further, in the present invention, the method further includes determining, by the mobile terminal, the at least one object. There are multiple methods for determining the at least one object by the mobile terminal, and three manners are used as examples herein.

In a first manner, the mobile terminal receives user input. The user input is used to set fingerprint recognition for the at least one function corresponding to the first control.

That is, the user input is an operation of the user for selecting at least one application program in the mobile terminal as a private application program.

In a second manner, when an application itself carries specific information that the user needs to perform fingerprint recognition, the mobile terminal determines, according to the specific information, that the application program is an application program that requires fingerprint recognition.

In a third manner, when an application itself does not carry specific information indicating that fingerprint recognition is required, after the user downloads the first control to the mobile terminal, an operating system of the mobile terminal sets the application program as an application program that requires fingerprint recognition.

The mobile terminal uses, by using the user input, an application program selected in the user enter as the application program that requires fingerprint recognition (the private application program). In this way, the mobile terminal only protects the application program that requires fingerprint recognition, instead of protecting all application programs in the mobile terminal as in the prior art, which ensures security of the application program that requires fingerprint recognition, and also avoids a problem of cumbersome use of another application program, that is, improves precision of a protection scope of information in the mobile terminal.

Optionally, the application program that requires fingerprint recognition is recorded into a first database. The first database is a database storing the first control.

Further, optionally, the first user interface is an interface that displays at least the first control. In the present invention, there are multiple manners of determining the first fingerprint recognition area of the touchscreen by the mobile terminal, and three manners are used as examples herein.

In a first manner, when the first control is the identifier of the second application program, the mobile terminal reads a layout of the first user interface. The mobile terminal determines, according to the layout of the first user interface, the first fingerprint recognition area corresponding to the first control.

Figure 2A:
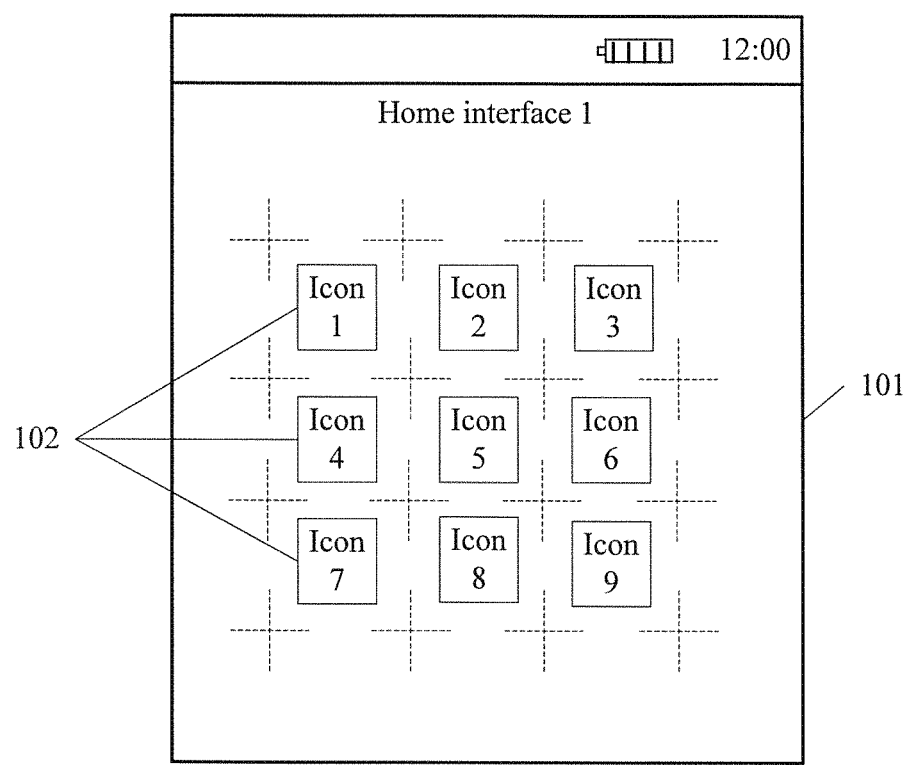
FIG. 2(a) is a schematic layout diagram of an application program icon in a fingerprint recognition method according to an embodiment of the present invention.

As shown in FIG. 2(a), FIG. 2(a) shows a layout of a user interface, where 101 indicates the layout of the first user interface, and 102 indicates an application program icon on the first user interface. It may be understood that, the mobile terminal in the present invention includes the at least one user interface.

In addition, there are multiple manners of determining an icon position on the first user interface, for example, coordinates. The first user interface and an application program icon layout on the first user interface shown in FIG. 2(a) are used as an example. A lower left corner on the first user interface is set as an origin of coordinates. Then a position of an icon 1 is x (15, 35), y (110, 130); a position of an icon 2 is x (50, 70), y (110, 130); a position of an icon 4 is x (15, 35), y (80, 100). A position of another icon may be sequentially obtained according to a distance to the origin, which is not described in detail herein.

It is noteworthy that, reading the layout of the first user interface in the present invention is to determine the icon position of the first control (the private application program) on the first user interface, so as to determine the fingerprint recognition area corresponding to the first control.

After the mobile terminal reads the icon layout on the first interface, the mobile terminal determines, according to the icon position of the first control on the first user interface, the fingerprint recognition area corresponding to the first control, where the icon position of the first control on the first user interface is the same as the first fingerprint recognition area corresponding to the first control.

It can be seen that, in this manner, the mobile terminal binds the icon position of the first control on the first user interface with the fingerprint recognition area corresponding to the first control. When the icon position of the first control on the first user interface is changed, the fingerprint recognition area corresponding to the first control is correspondingly changed, to ensure consistency between the icon position of the first control on the first user interface and the fingerprint recognition area corresponding to the first control.

Figure 2B:
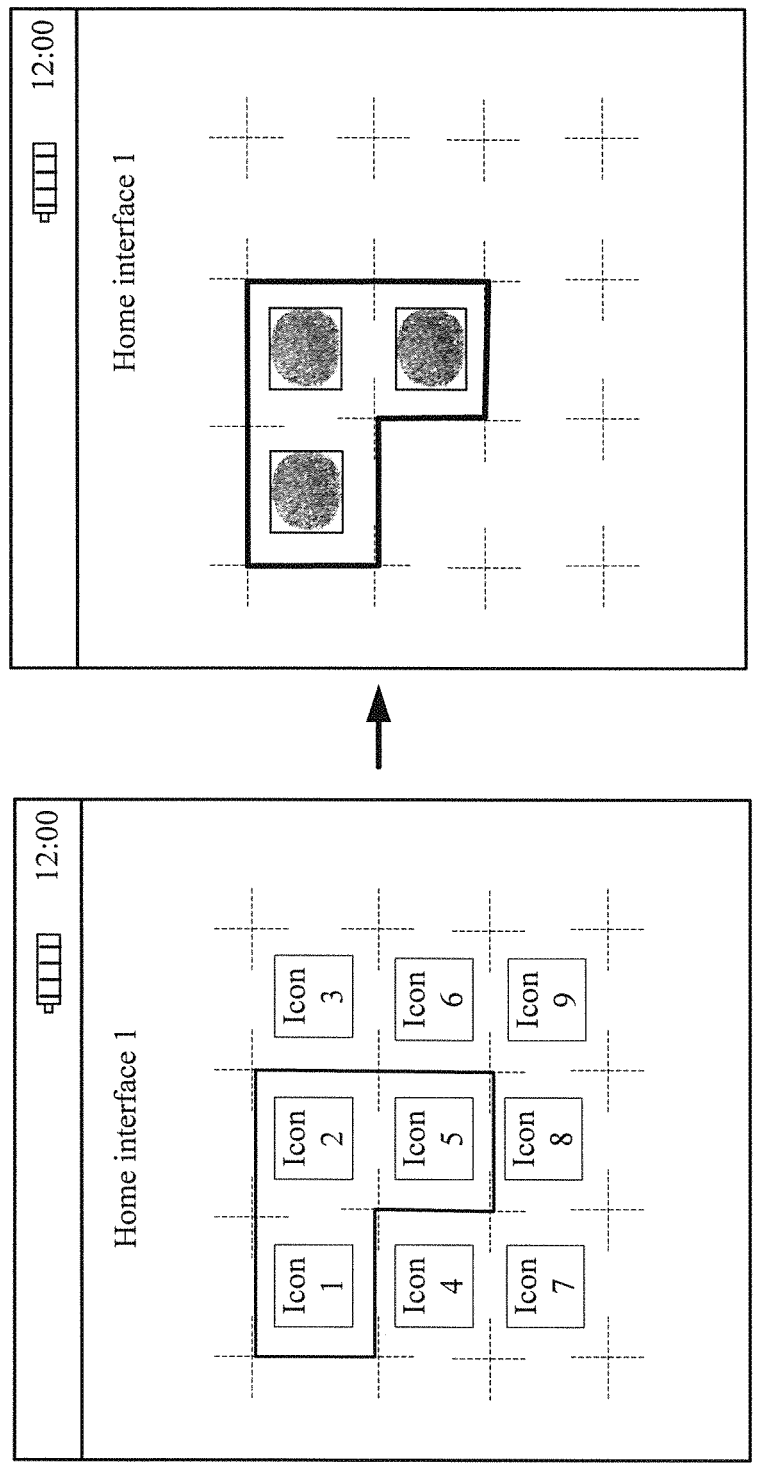
FIG. 2(b) is a schematic layout diagram of a fingerprint recognition area corresponding to a first control in a fingerprint recognition method according to an embodiment of the present invention.

An application program 1, an application program 2, and an application program 5 are set as the first control (correspondingly, the application program 1 is corresponding to the icon 1; the application program 2 is corresponding to the icon 2; and the application program 5 is corresponding to the icon 5). According to the application program icon layout on the first user interface in FIG. 2(a), the icon positions respectively corresponding to the application 1, the application 2, and the application 5 may be determined, thereby determining first fingerprint recognition areas respectively corresponding to the application 1, the application 2, and the application 5, as shown in FIG. 2(b).

In a second manner, the mobile terminal determines the first fingerprint recognition area by using a user operation. The user operation includes an operation of the user for determining the fingerprint recognition area and a user operation habit.

For the user operation habit, all users have their own habits of touching the screen. The mobile terminal may collect the user operation habit to determine which area of the screen is a frequently-used area of the user, and then determine the area as the first fingerprint recognition area.

It can be seen that, in this manner, the first fingerprint recognition area in the mobile terminal is a fingerprint recognition area that can be dynamically adjusted.

In a third manner, the mobile terminal determines, by using a fingerprint enter area specified by the first control, the fingerprint enter area indicated by the first control as the first fingerprint recognition area.

The first control in the second manner and the third manner may be the second application program, or may be the any button of the non-desktop management application program.

Figure 2C:
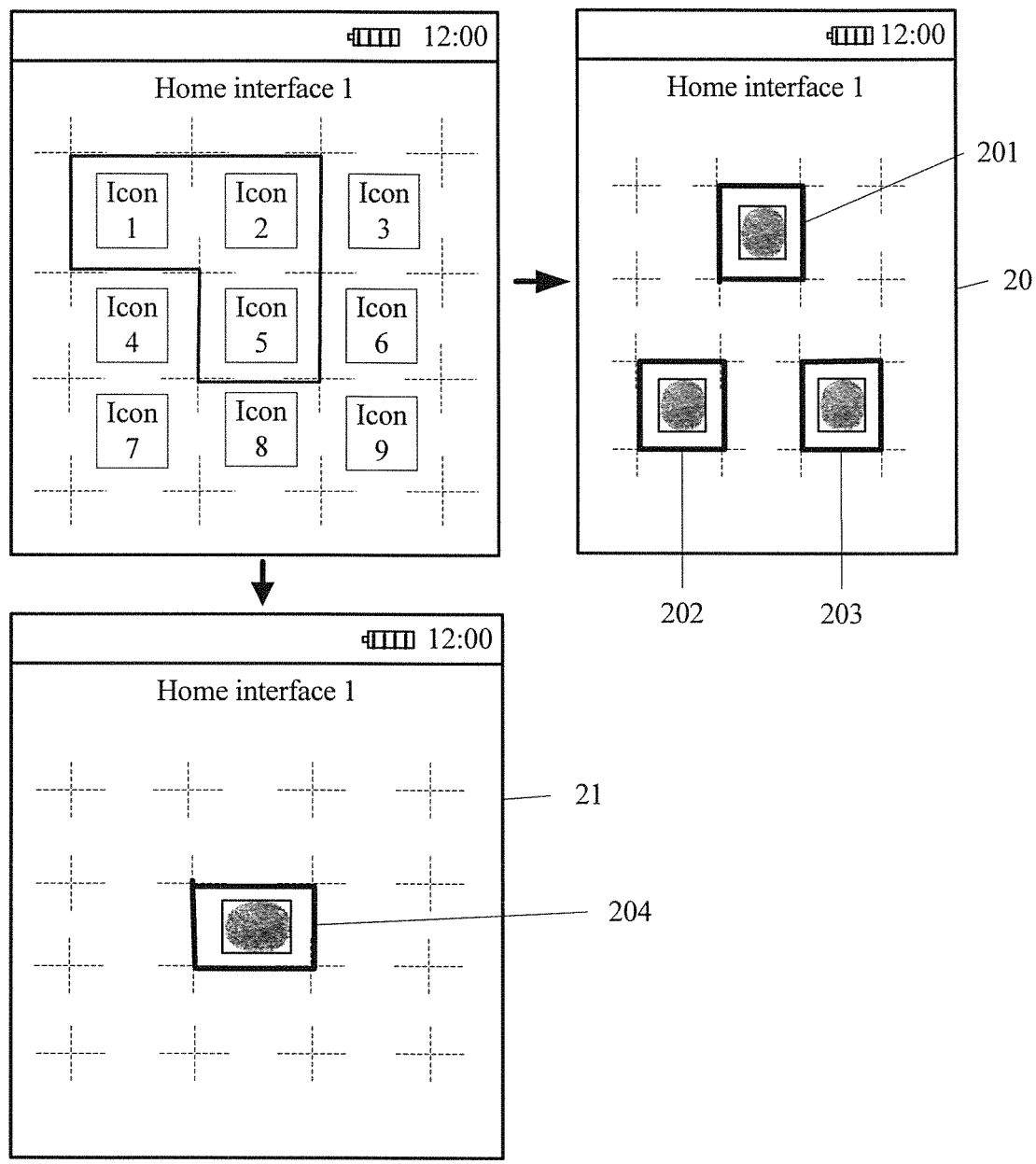
FIG. 2(c) is another schematic layout diagram of a fingerprint recognition area corresponding to a first control in a fingerprint recognition method according to an embodiment of the present invention.

It may be seen from the fingerprint recognition area determined in the foregoing three manners (the second manner, the third manner) that, there is no causal relationship between the fingerprint recognition area in the manners and the icon position of the first control on the first user interface (that is, a position of the fingerprint recognition area may not change with the icon position of the first control on the first user interface). The first control may be in a one-to-one correspondence with the fingerprint recognition area, or several application programs in the first control may be corresponding to one fingerprint recognition area. As shown in FIG. 2(c), after the first control is determined, on a first user interface 20, it may be seen that the fingerprint recognition area is in a one-to-one correspondence with the first control. The application program 1 is corresponding to a fingerprint recognition area 201, the application program 2 is corresponding to a fingerprint recognition area 202, and the application program 5 is corresponding to a fingerprint recognition area 203. On a first user interface 21, it may be seen that the three application programs (the application program 1, the application program 2, and the application program 5) are corresponding to the fingerprint recognition area 204.

Therefore, the first fingerprint recognition area is at least one recognition area. That is, the first fingerprint recognition area may be any recognition area in 201, 202, 203, and 204 in FIG. 2(c).

Further, optionally, after the mobile terminal receives the user input, when the first control is the identifier of the second application program, the fingerprint recognition method further includes:

adding a specific identifier to the first control, where the specific identifier is used to indicate that fingerprint recognition needs to be performed to execute the at least one function.

Figure 3A:
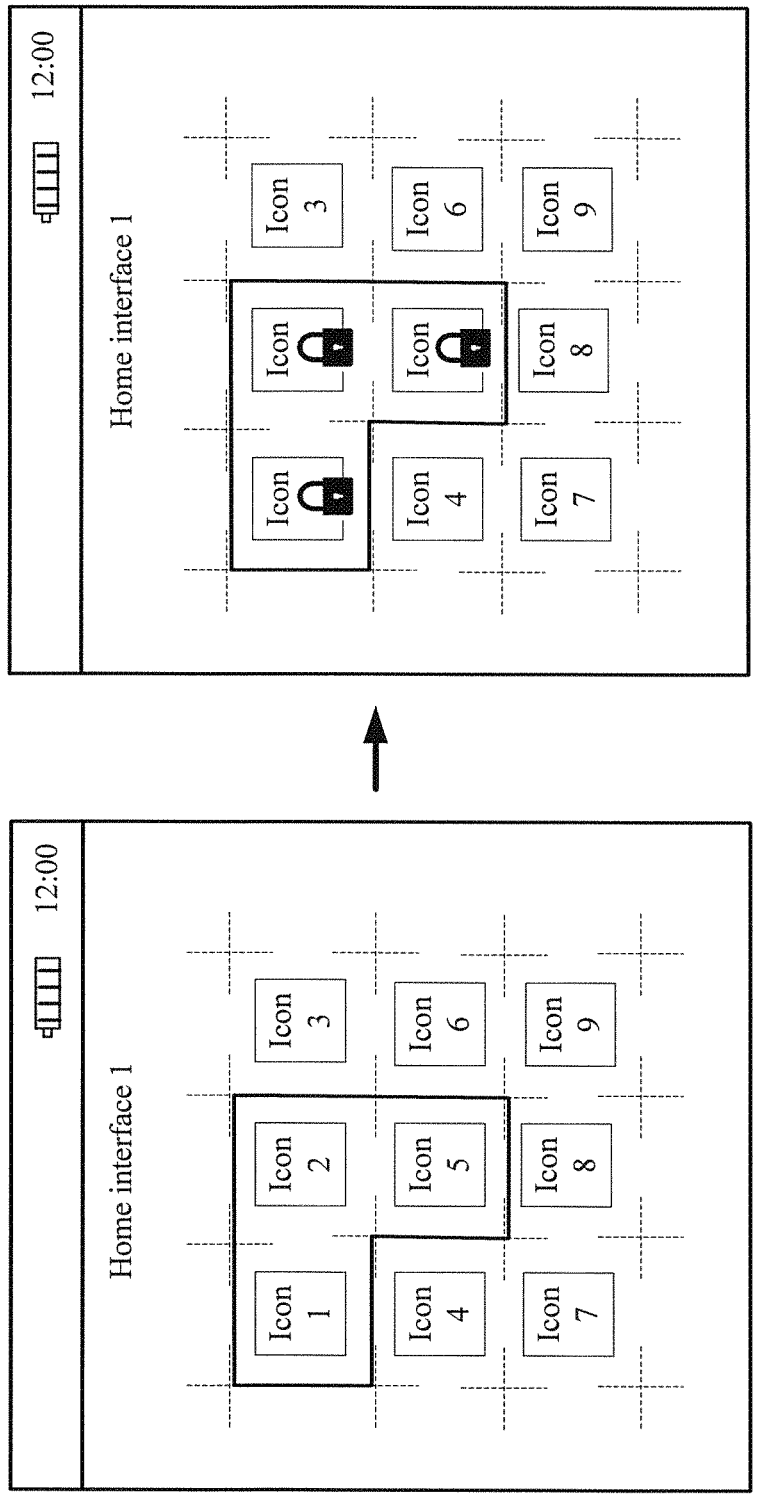
FIG. 3(a) is a schematic layout diagram of differentiating between and displaying a first control and another application program identifier in a fingerprint recognition method according to an embodiment of the present invention.
Figure 3B:
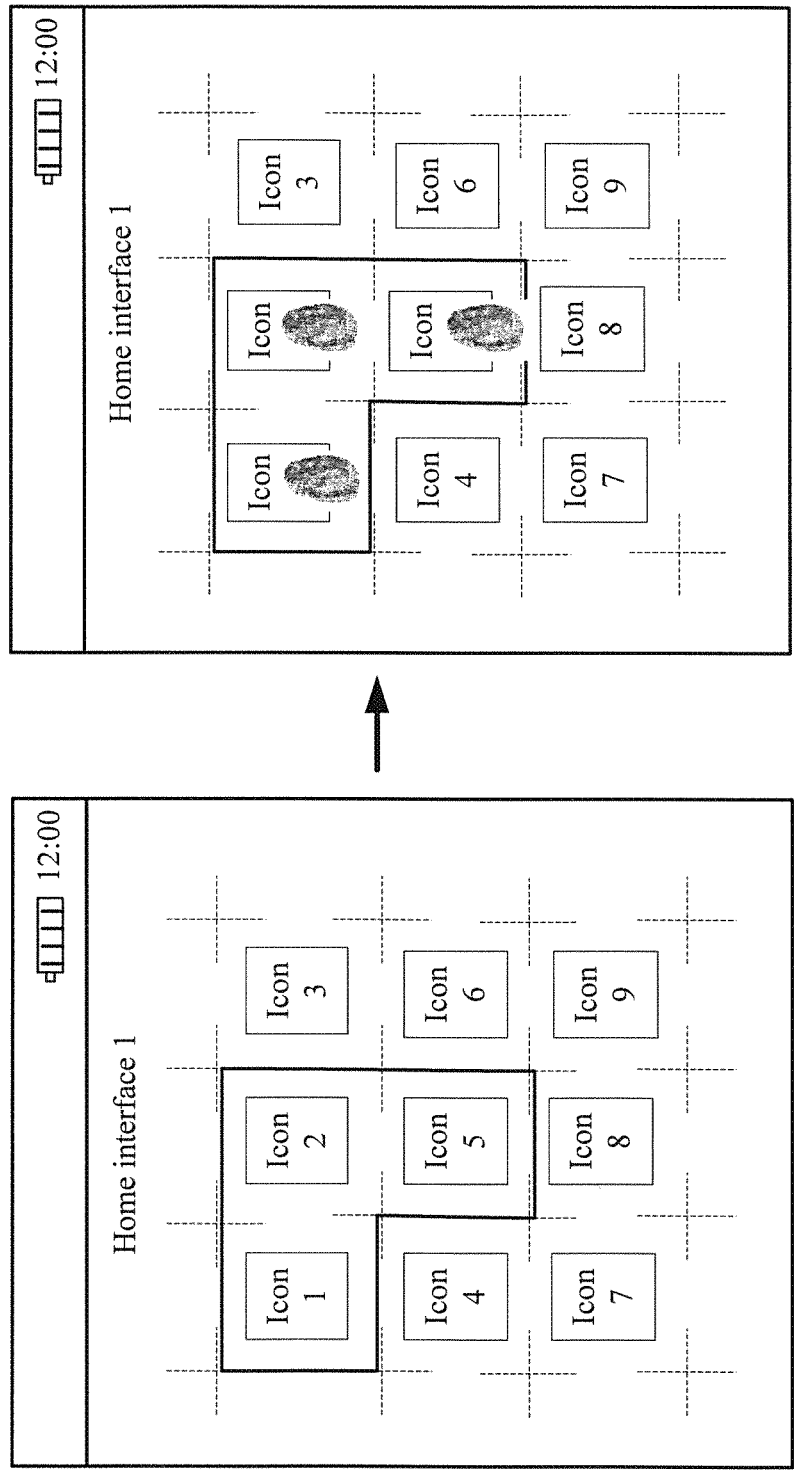
FIG. 3(b) is another schematic layout diagram of differentiating between and displaying a first control and another application program identifier in a fingerprint recognition method according to an embodiment of the present invention.

Specifically, a method for differentiating and displaying, by the mobile terminal, the first control by adding the specific identifier to the first control includes:

(1) The mobile terminal adds a corner mark or a badge to the first control, to indicate that the first control requires fingerprint recognition. For example, as shown in FIG. 3(a), the specific identifier may be a padlock icon; and as shown in FIG. 3(b), the specific identifier may be a fingerprint icon. The corner mark or the badge at least partially covers the icon of the first control; or, the corner mark or the badge may be displayed around the icon of the first control.

Figure 3C:
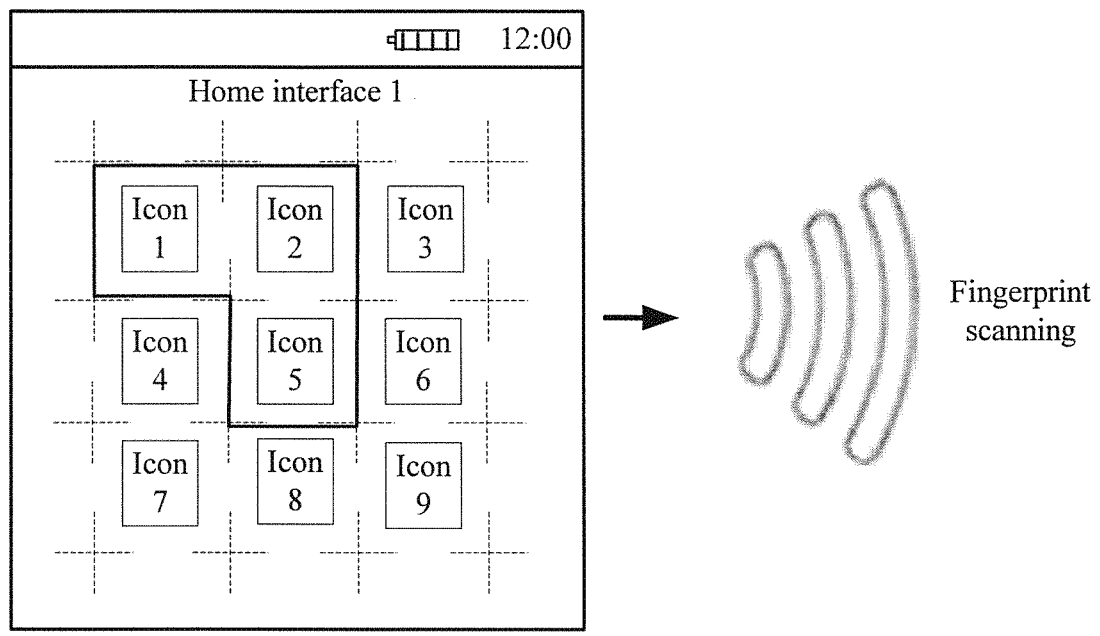
FIG. 3(c) is still another schematic layout diagram of differentiating between a first control and another application program identifier in a fingerprint recognition method according to an embodiment of the present invention.

(2) For the first control, the mobile terminal prompts, by playing a sound, the user to scan a fingerprint, as shown in FIG. 3(c).

(3) For the first control, the mobile terminal prompts, by means of vibration, the user to scan the fingerprint.

(4) For the first control, the mobile terminal prompts, by using a breathing light, the user to scan the fingerprint.

(5) For the first control, the mobile terminal prompts, by using a flashlight, the user to scan the fingerprint.

Figure 3D:
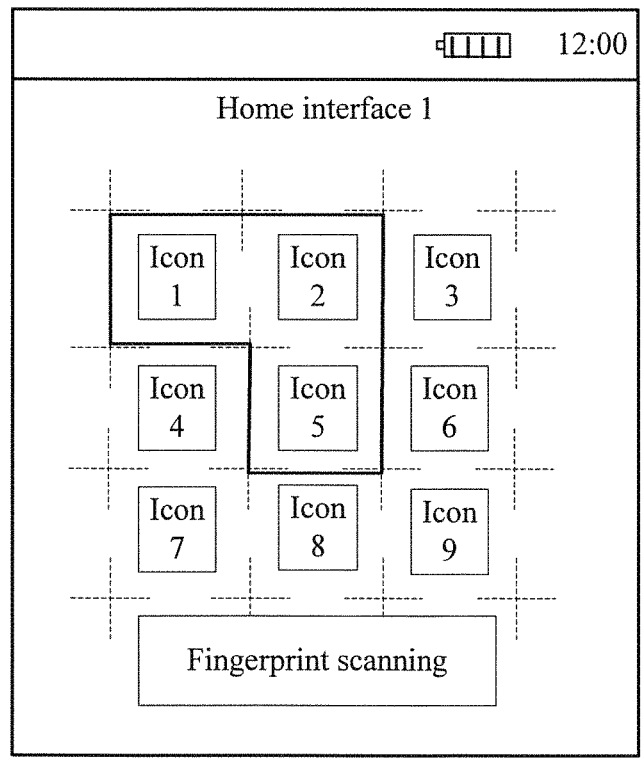
FIG. 3(d) is yet another schematic layout diagram of differentiating between a first control and another application program identifier in a fingerprint recognition method according to an embodiment of the present invention.

(6) For the first control, the mobile terminal prompts, by popping up a prompt dialog box, the user to scan the fingerprint, as shown in FIG. 3(d).

(7) For the first control, the mobile terminal prompts, by displaying the icon in different luminance, the user to scan the fingerprint.

Figure 3E:
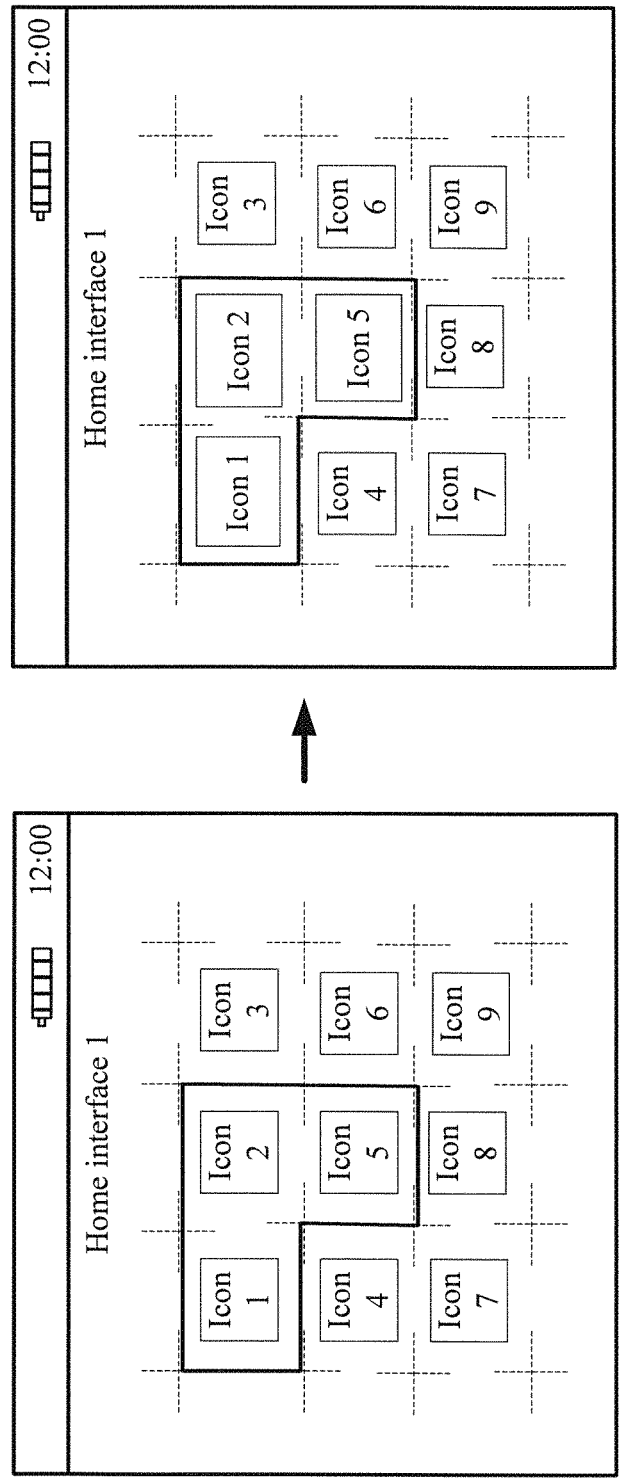
FIG. 3(e) is a further another schematic layout diagram of differentiating between a first control and another application program identifier in a fingerprint recognition method according to an embodiment of the present invention.

(8) For the first control, the mobile terminal prompts, by using application program icon distortion, the user to scan the fingerprint, for example, a size of the icon of the first control is greater than or less than a size of an icon of another application program, or a shape of the icon of the first control is different from a shape of an icon of another application program. As shown in FIG. 3(e), sizes of the icons of the application program 1, the application program 2, and the application program 5 are greater than a size of an icon of another application program.

Figure 3F:
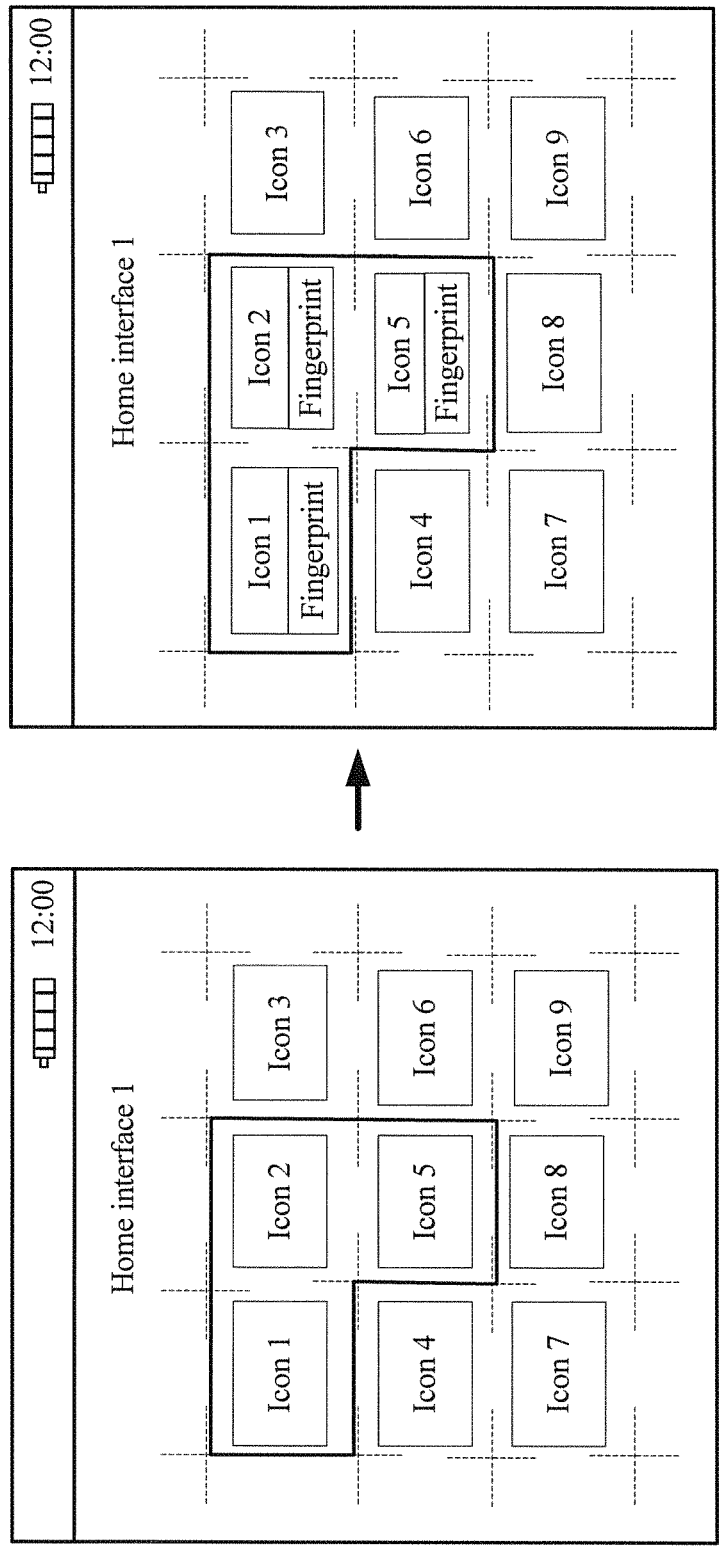
FIG. 3(f) is a still further another schematic layout diagram of differentiating between a first control and another application program identifier in a fingerprint recognition method according to an embodiment of the present invention.

(9) For the first control, the mobile terminal prompts, by using text information, for example a text information mark included in the icon of the first control, the user to scan the fingerprint. As shown in FIG. 3(f), the text information may be a fingerprint.

(10) For the first control, the mobile terminal prompts, by using a wearable device, the user to scan the fingerprint.

The mobile terminal adds the specific identifier to the first control so that the first control is different from an identifier of another application program, which enables the user to easily distinguish the first control on the first user interface, thereby preventing a problem of a power consumption increase of the mobile terminal caused by enabling the fingerprint recognition function of the mobile terminal by accidentally tapping the first control in a case in which the user cannot determine the first control by using the application program identifier, improving user experience.

Further, in step 103, there are multiple manners for determining, by the mobile terminal, whether the touch position corresponding to the touch operation is located in the first fingerprint recognition area. For example, the mobile terminal performs determining according to position coordinates of the touch operation. Specifically, when determining that an overlapped area between an area formed by the position coordinates of the touch operation and an area occupied by the first fingerprint recognition area reaches a specific area threshold, the mobile terminal determines that the touch operation is located in the first fingerprint recognition area.

Further, the first fingerprint information in step 105 is fingerprint information of a finger that initiates the touch operation.

It should be noted that, in step 104, one of manners for activating the fingerprint recognition function of the first fingerprint recognition area is determining whether the touch position corresponding to the touch operation is located in the first fingerprint recognition area, and when the touch position corresponding to the touch operation is located in the first fingerprint recognition area, activating, by the mobile terminal, the fingerprint recognition function.

Further, optionally, the present invention may further provide another two manners for activating the fingerprint recognition function of the first fingerprint recognition area.

In a first manner, when detecting that the first user interface is displayed, the mobile terminal activates the fingerprint recognition function.

In a second manner, when detecting that the touch operation is used as an operation for enabling at least one function corresponding to any object, the mobile terminal activates the fingerprint recognition function.

The function described herein includes the enabling function, the login function, the payment function, and the like.

Further, before step 105, the mobile terminal verifies whether the first fingerprint information matches the preset fingerprint information, and determines whether the at least one function of the first control needs to be performed by verifying correctness of the first fingerprint information by the mobile terminal.

Further, optionally, before verifying whether the first fingerprint information matches the preset fingerprint information, the mobile terminal receives the fingerprint entered by the user; and uses the fingerprint specifically entered by the user as the preset fingerprint, where the preset fingerprint information includes the preset fingerprint, and the preset fingerprint is used to enable the at least one function corresponding to the first control.

The mobile terminal may collect the fingerprint by using the fingerprint collection module. The fingerprint collection module may be a device such as a fingerprint sensor.

It may be understood that the preset fingerprint is a comparison fingerprint that is used to verify whether the first fingerprint information is correct. To obtain the preset fingerprint, the mobile terminal may prompt the user to enter the fingerprint, and in this case, a fingerprint entered by the user in a specific condition is the preset fingerprint.

Then, the preset fingerprint is bound to the at least one object (including the identifier of the second application program or the any button of the non-desktop management application program), so that when the first fingerprint information entered by the user matches the preset fingerprint information (including the preset fingerprint), the mobile terminal executes the at least one function corresponding to the at least one object.

Further, optionally, for achieving an objective of reducing the power consumption of the mobile terminal, the mobile terminal needs to disable the fingerprint recognition function. In the present invention, there are multiple manners of disabling the fingerprint recognition function by the mobile terminal, and several manners are used as examples herein.

In a first manner, when verifying that the first fingerprint information matches the preset fingerprint information, the mobile terminal disables the fingerprint recognition function.

In a second manner, when verifying that the first fingerprint information does not match the preset fingerprint information, and no user fingerprint information is detected in a first predetermined time, the mobile terminal disables the fingerprint recognition function.

In a third manner, when verifying that the first fingerprint information does not match the preset fingerprint information, and any user fingerprint information detected in a second predetermined time is inconsistent with the preset fingerprint information, the mobile terminal disables the fingerprint recognition function.

The first predetermined time in the second manner may be the same as or different from the second predetermined time in the third manner. The first predetermined time and the second predetermined time are only used to differentiate between different scenarios. In addition, the present invention constitutes no limitation on a specific value range of the first predetermined time and the second predetermined time. For example, the first predetermined time may be 5 s and the second predetermined time may be 10 s.

In a fourth manner, when verifying that the first fingerprint information does not match the preset fingerprint information, and a quantity of verification errors exceeds a quantity threshold, the mobile terminal disables the fingerprint recognition function.

Likewise, the present invention constitutes no limitation on a specific value range of the quantity threshold.

In a fifth manner, when verifying that the first fingerprint information does not match the preset fingerprint information, and detecting that the user touches a non-fingerprint recognition area, the mobile terminal disables the fingerprint recognition function. The non-fingerprint recognition area is an area except the first fingerprint recognition area.

In a sixth manner, after obtaining the first fingerprint information, the mobile terminal disables the fingerprint recognition function.

In a seventh manner, when detecting that a non-first user interface is displayed, the mobile terminal disables the fingerprint recognition function. The non-first user interface is an interface except the first user interface and an interface that displays all fingerprint recognition areas.

It should be noted that, a corresponding manner of disabling the fingerprint recognition function varies with a manner of activating, by the mobile terminal, the fingerprint recognition function corresponding to the first fingerprint recognition area. Specifically, when the mobile terminal activates the fingerprint recognition function in the manner in step 104, correspondingly, the mobile terminal disables the fingerprint recognition function in any manner of the foregoing first to sixth manners. When detecting that the first user interface is displayed, the mobile terminal activates the fingerprint recognition function. Correspondingly, the mobile terminal disables the fingerprint recognition function in the foregoing seventh manner. When detecting that the touch operation is to enable at least one function corresponding to any object, the mobile terminal activates the fingerprint recognition function. Correspondingly, the mobile terminal disables the fingerprint recognition function in any manner of the foregoing first to sixth manners.

For further reducing power consumption of the mobile terminal, a third predetermined time may be set on the mobile terminal. When the first control is restarted or the first control is re-executed in the third predetermined time, the first fingerprint information does not need to be received again, that is, the user does not need to enter the fingerprint again, and therefore the fingerprint recognition function does not need to be re-activated.

Likewise, the present invention constitutes no limitation on a specific value range of the third predetermined time. Certainly, the third predetermined time may be the same as the value range of the first predetermined time and/or the second predetermined time.

Further, optionally, after determining a fingerprint recognition area of a current interface, the mobile terminal may further mark the fingerprint recognition area, where a trigger condition of the marking is marking after the fingerprint recognition area is determined, or marking when it is detected that a finger is suspending above the fingerprint recognition area, or may further be marking after fingerprint verification fails.

Further, optionally, when mobile terminal verifies that the first fingerprint information does not match the preset fingerprint information, the present invention provides another fingerprint recognition method, where the method includes: receiving, by the mobile terminal, password information entered by the user, and when the password information matches preset password information, executing the at least one function of the first control.

Specifically, when the first fingerprint information does not match the preset fingerprint information, the mobile terminal may display a password input dialog box, to instruct the user holding the mobile terminal to enter a password in the password input dialog box; then, the mobile terminal receives password information entered by the user, detects the password information, and when detecting that the password information entered by the user matches the preset password information, activates the at least one function of the first control. The preset password information is a password for enabling a function of the first control.

It may be understood that, the mobile terminal further needs to obtain password information specifically entered by the user, and then use the specifically entered password information as the preset password information.

Figure 4A:
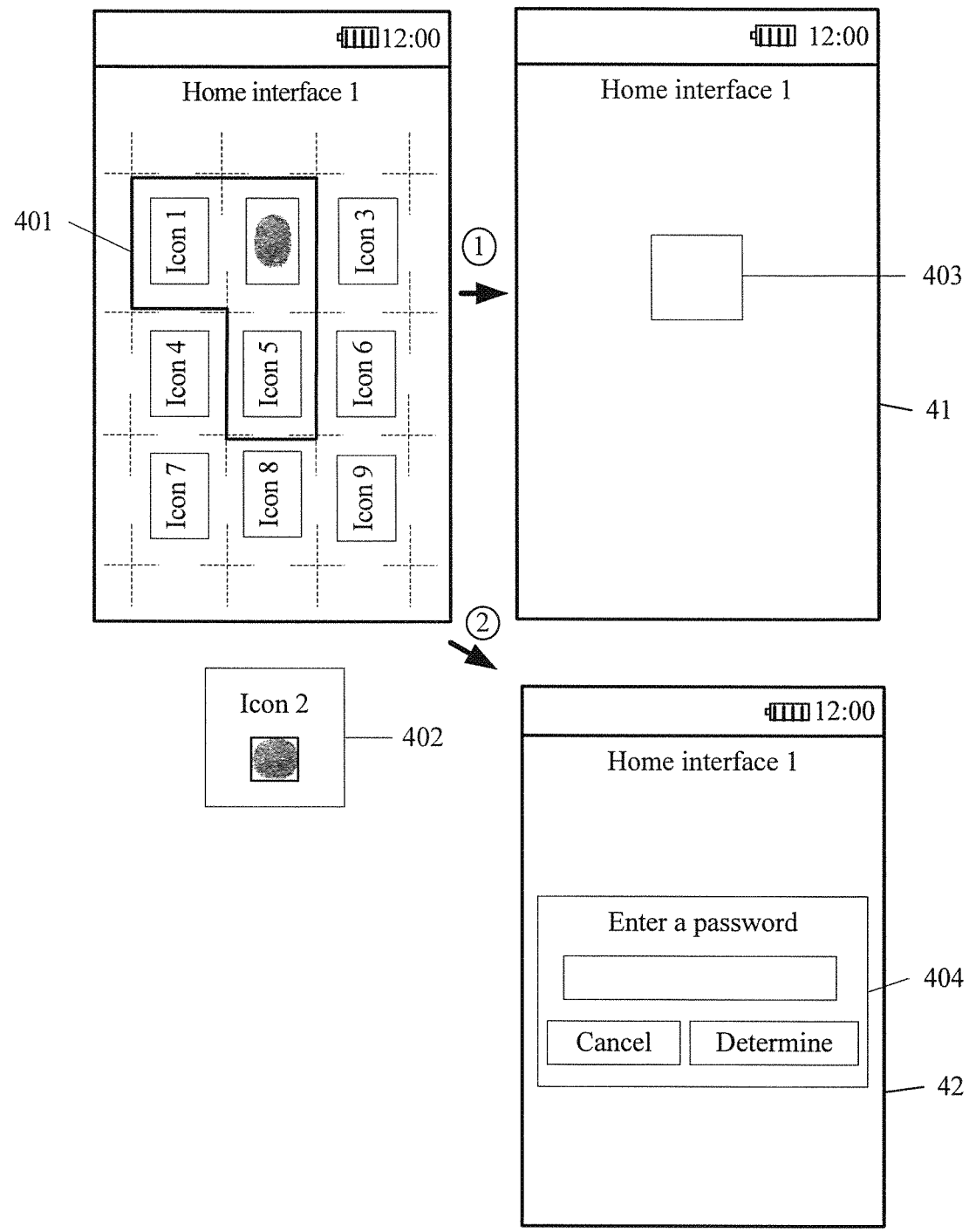
FIG. 4(a) is a schematic layout diagram of a recognition area corresponding to a first control in a fingerprint recognition method according to an embodiment of the present invention.

Optionally, when detecting that the touch operation of the user is used as a means for enabling the first control, but failing to obtain the first fingerprint information during the touch (which indicates that the fingerprint recognition area corresponding to the first control is different from the icon position of the first control on the first user interface, and the mobile terminal cannot obtain a target fingerprint of the user at the same time when the user touches the first control), the mobile terminal may display only the fingerprint recognition area corresponding to the first control, as shown in FIG. 4(a).

It may be seen from FIG. 4(a) that, the first control is displayed in 401. When the user triggers the function for enabling the first control (the user taps the icon 2 corresponding to the application program 2, and 402 is magnified display), a first user interface 41 of an arrow marked by ① is first displayed; on the first user interface 41, the mobile terminal displays only a fingerprint recognition area 403 corresponding to the first control; then, the mobile terminal receives the touch operation of the user, and obtains the target fingerprint of the user during the touch. After detecting that the first fingerprint information is inconsistent with the preset fingerprint, a first user interface 42 of an arrow marked by ② is displayed; on the first user interface 42, the mobile terminal displays only a password identification area 404 corresponding to the first control. It may be understood that, in the present invention, a priority of fingerprint recognition is higher than that of password identification. Therefore, in FIG. 4(a), the fingerprint recognition area corresponding to the first control is displayed first.

Figure 4B:
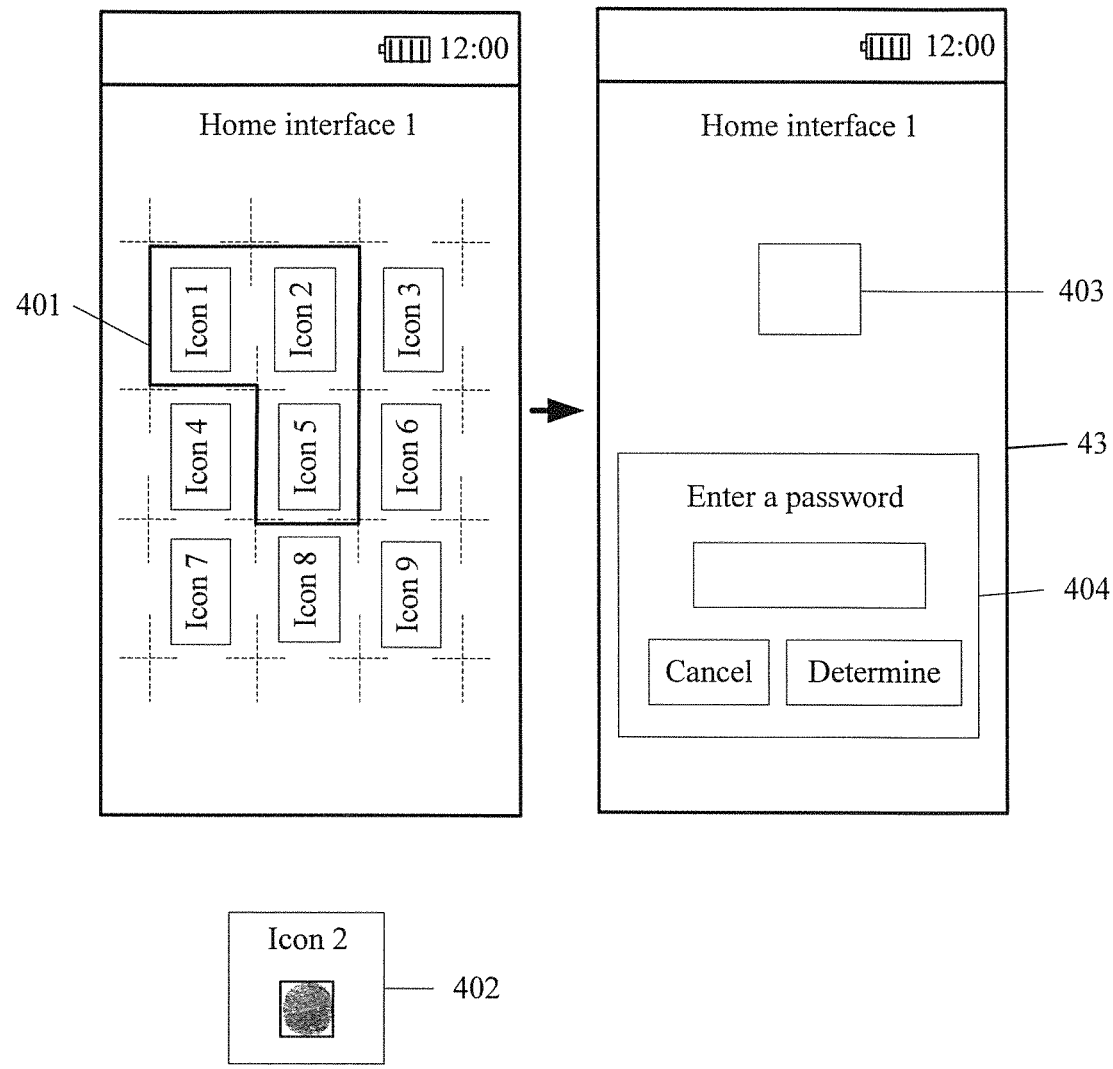
FIG. 4(b) is another schematic layout diagram of a recognition area corresponding to a first control in a fingerprint recognition method according to an embodiment of the present invention.

Alternatively, the fingerprint recognition area and a password enter area that are corresponding to the first control may be displayed at the same time, as shown in FIG. 4(b). It may be seen from a first user interface 43 shown in FIG. 4(b) that, the fingerprint recognition area 403 and the password identification area 404 are displayed on the screen at the same time.

In the present invention, a fingerprint recognition technology and a password identification technology can be combined, so that the auxiliary password identification technology is added while the fingerprint recognition technology is used, which ensures security of privacy information in the mobile terminal.

Figure 5A:
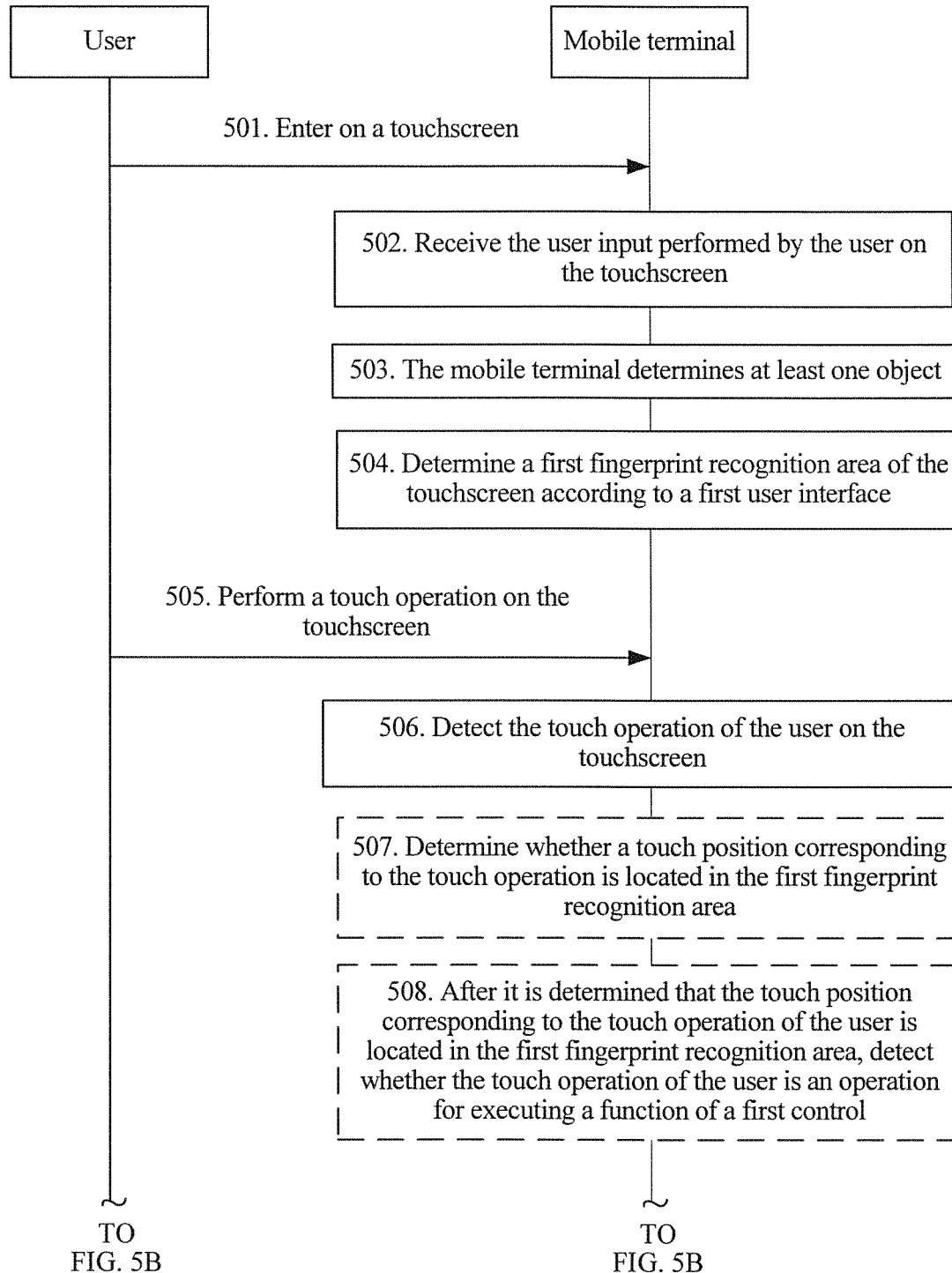
FIG. 5A and FIG. 5B are a flowchart of another fingerprint recognition method according to an embodiment of the present invention.
Figure 5B:
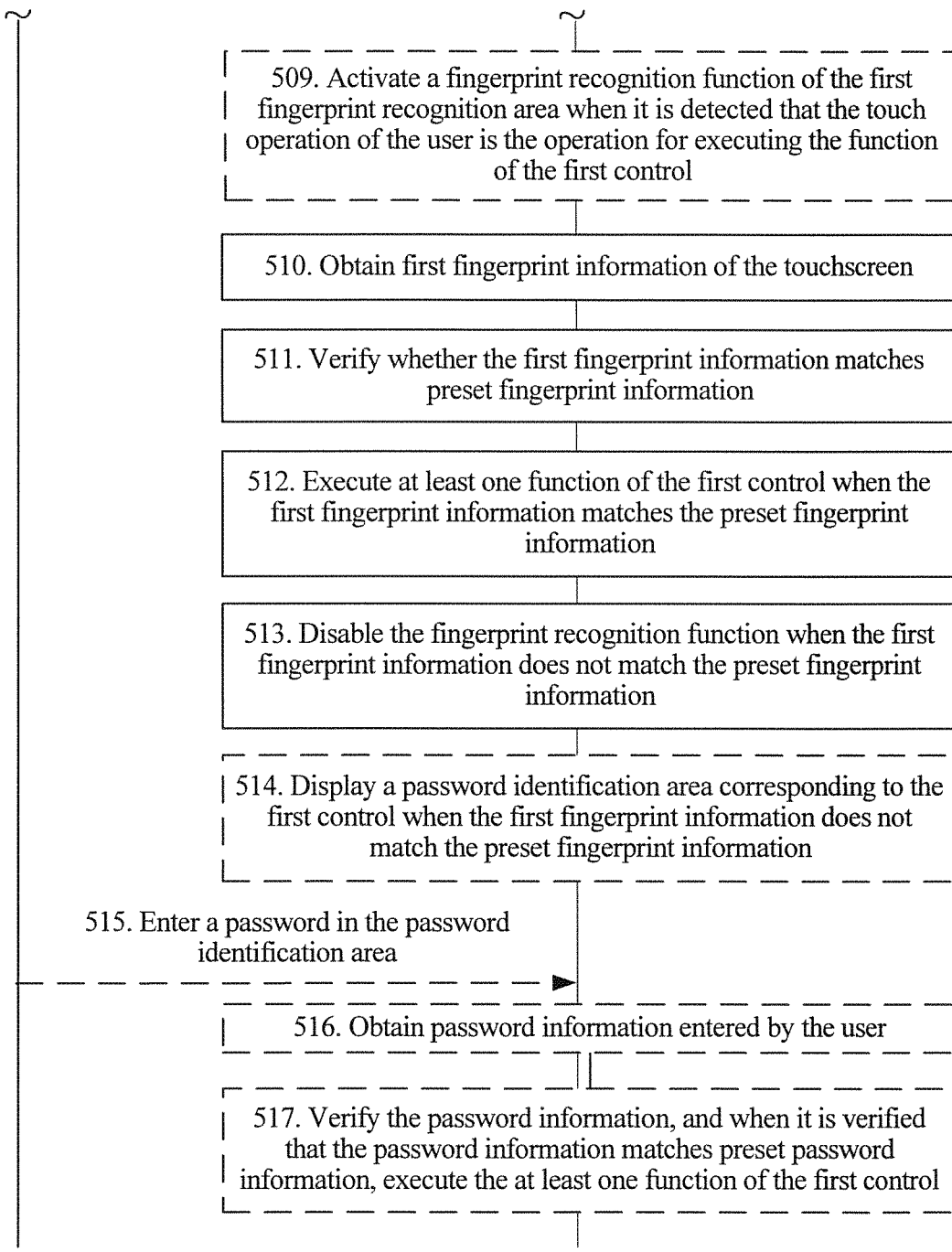

Further, with reference to the description of any one or several of the foregoing FIG. 1 to FIG. 4, the present invention further provides a fingerprint recognition method. As shown in FIG. 5A and FIG. 5B, the method includes:

501. A user holding a mobile terminal enters on a touchscreen.

502. The mobile terminal receives the user input performed by the user on the touchscreen.

The user input is used to set fingerprint recognition for at least one function corresponding to a first control. 503. The mobile terminal determines at least one object.

The mobile terminal determines the at least one object by using information such as the user input. Other information about the determining, by the mobile terminal, the at least one object is described above, which is not described in detail herein.

The at least one object is a first control of a first application program.

Optionally, the mobile terminal adds a specific identifier to the first control. The specific identifier is used to indicate that fingerprint recognition needs to be performed to execute the at least one function.

It may be understood that, this step is an optional step.

504. The mobile terminal determines a first fingerprint recognition area of the touchscreen according to a first user interface.

The first fingerprint recognition area is corresponding to the at least one object of the first user interface, and the at least one object is corresponding to the at least one function.

505. The user performs a touch operation on the touchscreen.

506. The mobile terminal detects the touch operation of the user on the touchscreen.

507. The mobile terminal determines whether a touch position corresponding to the touch operation of the user is located in the first fingerprint recognition area.

After determining that the touch position corresponding to the touch operation of the user is located in the first fingerprint recognition area, the mobile terminal continues to perform step 508.

508. The mobile terminal detects whether the touch operation of the user is an operation for executing a function of the first control.

The operation for executing the function corresponding to the first control may be an operation of tapping the first control.

When detecting that the touch operation of the user serves as the operation for executing the function corresponding to the first control, the mobile terminal continues to perform step 509.

509. The mobile terminal activates a fingerprint recognition function of the first fingerprint recognition area.

It may be understood that, steps 507 to 509 are optional steps, which are specifically about how to enable the fingerprint recognition function. Optionally, the mobile terminal may activate the fingerprint recognition function in another manner, for example, if the fingerprint recognition function is already enabled on the first user interface, the mobile terminal obtains first fingerprint information after detecting that the touch operation of the user on the touchscreen is the operation for executing the function corresponding to the first control.

510. Obtain first fingerprint information of the touchscreen.

511. The mobile terminal verifies whether the first fingerprint information matches preset fingerprint information.

When the first fingerprint information matches the preset fingerprint information, the mobile terminal continues to perform step 512; or when the first fingerprint information does not match the preset fingerprint information, the mobile terminal continues to perform step 513.

512. The mobile terminal executes the at least one function of the first control.

513. The mobile terminal disables the fingerprint recognition function.

This step is corresponding to steps 507 to 509, and therefore this step is an optional step.

There are multiple manners of disabling the fingerprint recognition function by the mobile terminal, for example, when detecting that a non-first user interface is displayed, the mobile terminal disables the fingerprint recognition function. Alternatively, when the first fingerprint information matches the preset fingerprint information, the mobile terminal may directly disable the fingerprint recognition function.

514. The mobile terminal displays a password identification area corresponding to the first control.

515. The user inputs a password in the password identification area.

516. The mobile terminal obtains password information entered by the user.

517. The mobile terminal verifies the password information. When it is verified that the password information matches preset password information, the at least one function of the first control is executed.

When it is detected that the password information entered by the user does not match the preset password information, the mobile terminal is forbidden to execute the at least one function of the first control.

For steps 514 to 516, reference may be made to FIG. 4(a). That is, after the mobile terminal determines that the first fingerprint information entered by the user is inconsistent with the preset fingerprint information, the mobile terminal displays the password identification area on the screen.

It is noteworthy that, the embodiment shown in FIG. 4(a) is merely a manner of executing a function of the first control.

Optionally, the present invention may further provide an embodiment shown in FIG. 4(b). In this case, steps 510 to 512 and steps 516 to 517 are paralleled steps, and the user may select either of the two input manners. Correspondingly, in step 514, the mobile terminal displays an area corresponding to the first control, including the fingerprint recognition area and the password identification area.

The present invention can reduce power consumption of a mobile terminal, and ensure security of a private application program while improving precision of a protection scope of information in the mobile terminal; in addition, the present invention can further combine a fingerprint recognition technology with a password identification technology, so that the auxiliary password identification technology is added while the fingerprint recognition technology is used, which improves security of privacy information, thereby improving user experience.

Figure 6:
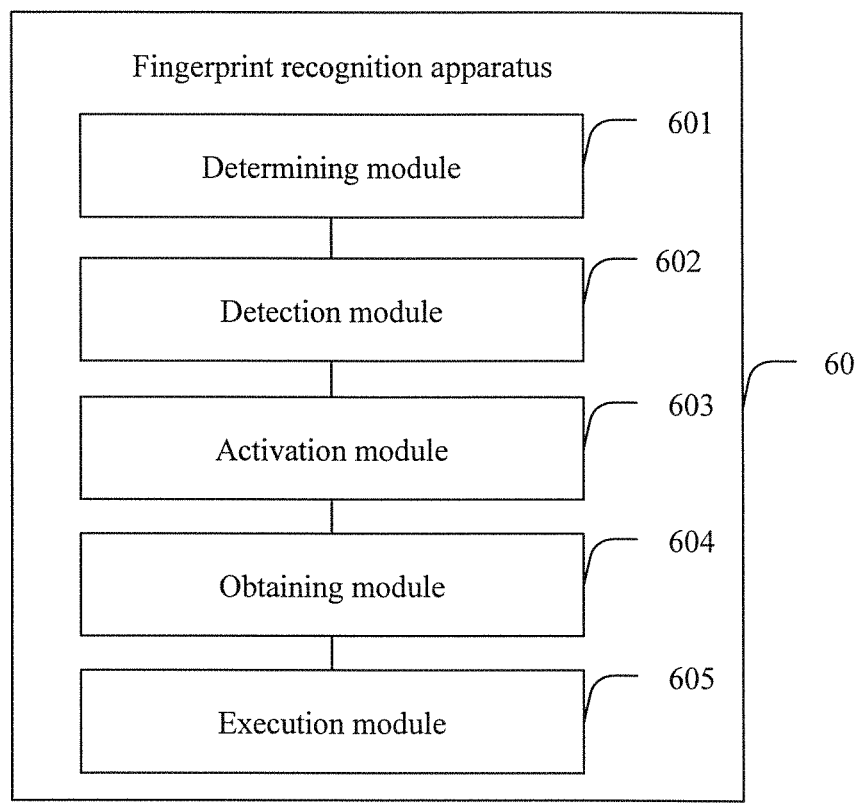
FIG. 6 is a schematic logical structural diagram of a fingerprint recognition apparatus according to an embodiment of the present invention.

With reference to the description of any one or several of the foregoing FIG. 1 to FIG. 5B, an embodiment of the present invention provides a fingerprint recognition apparatus 60. As shown in FIG. 6, the apparatus 60 includes: a determining module 601, a detection module 602, an activation module 603, an obtaining module 604, and an execution module 605.

The determining module 601 is configured to determine a first fingerprint recognition area of a touchscreen according to a first user interface.

The first fingerprint recognition area is corresponding to at least one object of the first user interface, and the at least one object is corresponding to at least one function.

The detection module 602 is configured to detect whether a touch position corresponding to a touch operation is located in the first fingerprint recognition area, and provide a detection result to the activation module 603.

The activation module 603 is configured to activate a fingerprint recognition function of the first fingerprint recognition area when the detection result is that the touch position corresponding to the touch operation is located in the first fingerprint recognition area.

The obtaining module 604 is configured to obtain corresponding first fingerprint information according to the touch operation, and provide the first fingerprint information to the execution module 605.

The execution module 605 is configured to execute the at least one function when the first fingerprint information matches preset fingerprint information.

Figure 7:
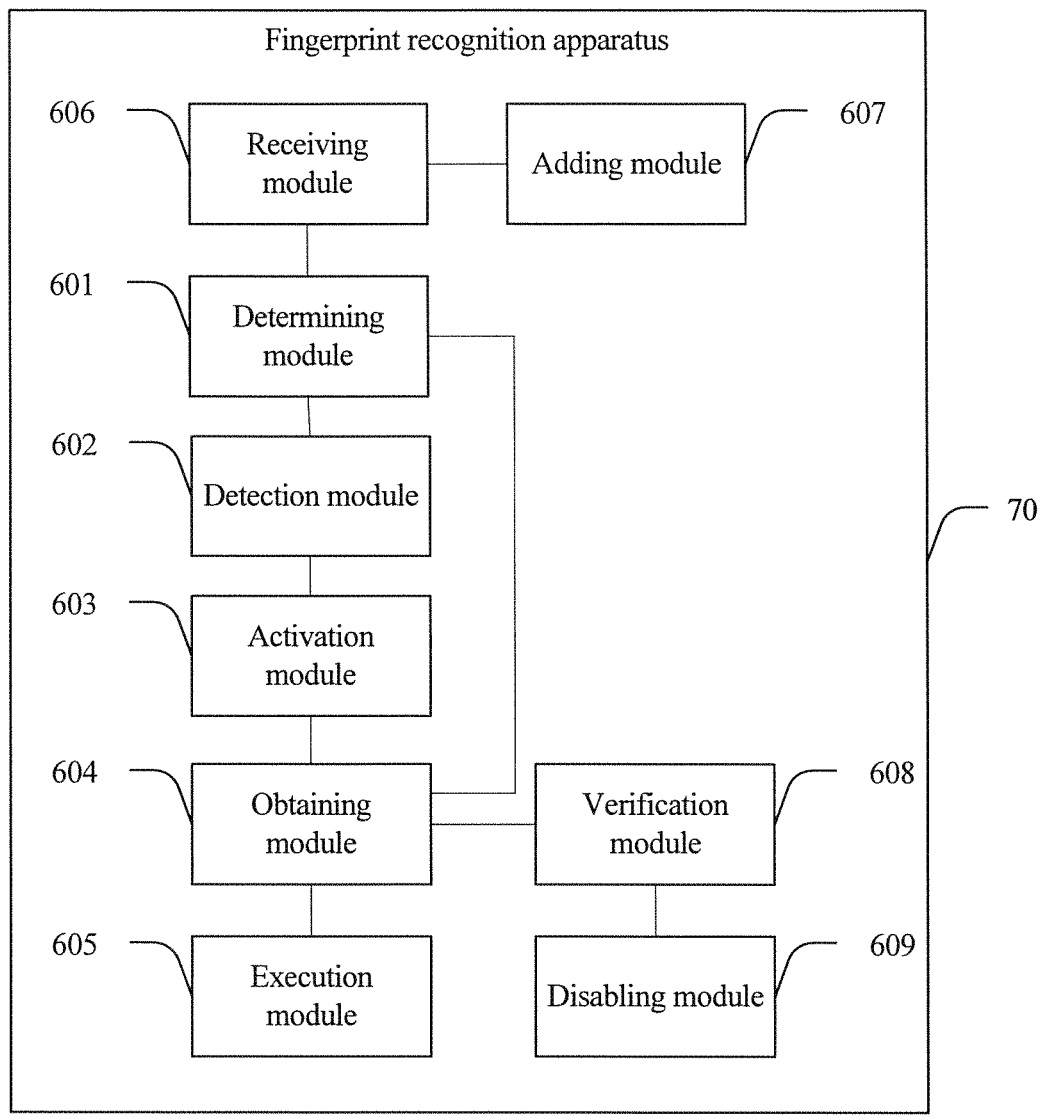
FIG. 7 is a schematic logical structural diagram of another fingerprint recognition apparatus according to an embodiment of the present invention.

Further, as shown in FIG. 7, the present invention may further provide a fingerprint recognition apparatus 70, where the apparatus 70 further includes: a receiving module 606, an adding module 607, a verification module 608, and a disabling module 609.

Before the determining module 601 determines the first fingerprint recognition area of the touchscreen according to the first user interface, the receiving module 606 is configured to receive user input, and provide the user input to the adding module 607.

The at least one object of the first user interface is a first control of a first application program. The user input is used to set fingerprint recognition for the at least one function corresponding to the first control.

Further, when the first application program is a desktop management application program, the first control is an identifier of a second application program, and the at least one function is to start the second application program. When the first application program is a non-desktop management application program, the first control is any button of the non-desktop management application program, and the at least one function is to start a function corresponding to the any button.

Further, optionally, the adding module 607 is configured to add a specific identifier to the first control after the receiving module 606 receives the user input.

The specific identifier is used to indicate that fingerprint recognition needs to be performed to execute the at least one function.

Specifically, the mobile terminal differentiates and displays the first control by adding the specific identifier to the first control.

The adding module 60 adds the specific identifier to the first control so that the first control is different from an identifier of another application program, which enables the user to easily distinguish the first control on the first user interface, thereby preventing a problem of a power consumption increase of the mobile terminal caused by enabling the fingerprint recognition function of the mobile terminal by accidentally tapping the first control in a case in which the user cannot determine the first control by using the application program identifier, improving user experience.

Further, optionally, that the determining module 601 determines a first fingerprint recognition area of a touchscreen according to a first user interface specifically includes:

The determining module 601 is specifically configured to determine the first fingerprint recognition area corresponding to the first control according to a first user interface of the first application program, where the first user interface is an interface that displays at least the first control.

For example, when the first control is the identifier of the second application program, the obtaining module 604 reads a layout of the first user interface. The determining module 601 determines the first fingerprint recognition area corresponding to the first control according to the layout of the first user interface. As shown in FIG. 2(a), FIG. 2(a) shows a layout of a user interface, where 101 indicates the layout of the first user interface, and 102 indicates an application program icon on the first user interface. It may be understood that, the mobile terminal in the present invention includes the at least one user interface.

In addition, there are multiple manners of determining an icon position on the first user interface, for example, coordinates. The first user interface and an application program icon layout on the first user interface shown in FIG. 2(a) are used as an example. A lower left corner on the first user interface is set as an origin of coordinates. Then a position of an icon 1 is x (15, 35), y (110, 130); a position of an icon 2 is x (50, 70), y (110, 130); a position of an icon 4 is x (15, 35), y (80, 100). A position of another icon may be sequentially obtained according to a distance to the origin, which is not described in detail herein.

After the obtaining module 604 reads the icon layout on the first interface, the determining module 601 determines, according to the icon position of the first control on the first user interface, the fingerprint recognition area corresponding to the first control, where the icon position of the first control on the first user interface is the same as the first fingerprint recognition area corresponding to the first control.

It can be seen that, in this manner, the icon position of the first control on the first user interface is bound with the fingerprint recognition area corresponding to the first control. When the icon position of the first control on the first user interface is changed, the fingerprint recognition area corresponding to the first control is correspondingly changed, to ensure consistency between the icon position of the first control on the first user interface and the fingerprint recognition area corresponding to the first control.

An application program 1, an application program 2, and an application program 5 are set as the first control (correspondingly, the application program 1 is corresponding to the icon 1; the application program 2 is corresponding to the icon 2; and the application program 5 is corresponding to the icon 5). According to the application program icon layout on the first user interface in FIG. 2(a), the icon positions respectively corresponding to the application 1, the application 2, and the application 5 may be determined, thereby determining first fingerprint recognition areas respectively corresponding to the application 1, the application 2, and the application 5, as shown in FIG. 2(b).

In a second manner, the determining module 601 determines the first fingerprint recognition area by using a user operation. The user operation includes an operation of the user for determining the fingerprint recognition area and a user operation habit.

For the user operation habit, all users have their own habits of touching the screen. The obtaining module 604 may collect the user operation habit to determine which area of the screen is a frequently-used area of the user, and then determine the area as the first fingerprint recognition area.

It can be seen that, in this manner, the first fingerprint recognition area in the mobile terminal is a fingerprint recognition area that can be dynamically adjusted.

In a third manner, the determining module 601 determines, by using a fingerprint enter area specified by the first control, the fingerprint enter area indicated by the first control as the first fingerprint recognition area.

The first control in the second manner and the third manner may be the second application program, or may be the any button of the non-desktop management application program.

It may be seen from the fingerprint recognition area determined in the foregoing three manners (the second manner, the third manner) that, there is no causal relationship between the fingerprint recognition area in the manners and the icon position of the first control on the first user interface (that is, a position of the fingerprint recognition area may not change with the icon position of the first control on the first user interface). The first control may be in a one-to-one correspondence with the fingerprint recognition area, or several application programs in the first control may be corresponding to one fingerprint recognition area. As shown in FIG. 2(c), after the first control is determined, on a first user interface 20, it may be seen that the fingerprint recognition area is in a one-to-one correspondence with the first control. The application program 1 is corresponding to a fingerprint recognition area 201, the application program 2 is corresponding to a fingerprint recognition area 202, and the application program 5 is corresponding to a fingerprint recognition area 203. On a first user interface 21, it may be seen that the three application programs (the application program 1, the application program 2, and the application program 5) are corresponding to the fingerprint recognition area 204.

Therefore, the first fingerprint recognition area is at least one recognition area. That is, the first fingerprint recognition area may be any recognition area in 201, 202, 203, and 204 in FIG. 2(c).

Further, optionally, that the determining module 601 determines a first fingerprint recognition area of a touchscreen according to a first user interface further includes:

The determining module 601 is further configured to determine a first fingerprint recognition area corresponding to the first control according to a type of the first control, where the type is a type that requires fingerprint recognition.

The type described herein is as follows: when an application itself carries specific information indicating that the user needs to perform fingerprint recognition, it is determined, according to the specific information, that the application program is an application program that requires fingerprint recognition; or when an application itself does not carry specific information indicating that fingerprint recognition is required, after the user downloads the first control to the mobile terminal, an operating system sets the application program as an application program that requires fingerprint recognition.

Further, optionally, a manner of activating the fingerprint recognition function of the first fingerprint recognition area by the activation module 603 includes not only the foregoing manner (when the detection result is that the touch position corresponding to the touch operation is located in the first fingerprint recognition area, the fingerprint recognition function of the first fingerprint recognition area is activated), and further includes the following:

When it is detected that the first user interface is displayed, the activation module 603 activates the fingerprint recognition function; and when it is detected that the touch operation is used as an operation for enabling the at least one function corresponding to the any object, the activation module 603 activates the fingerprint recognition function. The function described herein includes an enabling function, a login function, a payment function, and the like.

Further, optionally, after obtaining the first fingerprint information of the touchscreen, the obtaining module 604 is further configured to provide the first fingerprint information to the verification module 608.

The verification module 608 is configured to verify whether the first fingerprint information matches the preset fingerprint information, and provide a verification result to the disabling module 609.

It may be understood that, the preset fingerprint information is fingerprint information that is entered by the user in advance and is used for comparison with the first fingerprint information, and the preset fingerprint information is provided to the verification module 608; after the obtaining module 604 provides the obtained first fingerprint information to the verification module 608, the verification module compares the first fingerprint information with the stored preset fingerprint information, to verify whether the first fingerprint information matches the preset fingerprint information.

Further, optionally, for achieving an objective of reducing the power consumption of the mobile terminal, the disabling module 609 needs to disable the fingerprint recognition function. In the present invention, there are multiple manners of disabling the fingerprint recognition function by the disabling module 609, and several manners are used as examples herein.

In a first manner, when it is verified that the first fingerprint information matches the preset fingerprint information, the disabling module 609 disables the fingerprint recognition function.

In a second manner, when it is verified that the first fingerprint information does not match the preset fingerprint information, and no user fingerprint information is detected in a first predetermined time, the disabling module 609 disables the fingerprint recognition function.

In a third manner, when it is verified that the first fingerprint information does not match the preset fingerprint information, and any user fingerprint information detected in a second predetermined time is inconsistent with the preset fingerprint information, the disabling module 609 disables the fingerprint recognition function.

The first predetermined time in the second manner may be the same as or different from the second predetermined time in the third manner. The first predetermined time and the second predetermined time are only used to differentiate between different scenarios. In addition, the present invention constitutes no limitation on a specific value range of the first predetermined time and the second predetermined time. For example, the first predetermined time may be 5 s and the second predetermined time may be 10 s.

In a fourth manner, when it is verified that the first fingerprint information does not match the preset fingerprint information, and a quantity of verification errors exceeds a quantity threshold, the disabling module 609 disables the fingerprint recognition function.

Likewise, the present invention constitutes no limitation on a specific value range of the quantity threshold.

In a fifth manner, when it is verified that the first fingerprint information does not match the preset fingerprint information, and it is detected that the user touches a non-fingerprint recognition area, the disabling module 609 disables the fingerprint recognition function. The non-fingerprint recognition area is an area except the first fingerprint recognition area.

In a sixth manner, after the first fingerprint information is obtained, the disabling module 609 disables the fingerprint recognition function.

In a seventh manner, when it is detected that a non-first user interface is displayed, the disabling module 609 disables the fingerprint recognition function. The non-first user interface is an interface except the first user interface and an interface that displays all fingerprint recognition areas.

It should be noted that, a corresponding manner of disabling the fingerprint recognition function varies with a manner of activating, by the activation module 603, the fingerprint recognition function corresponding to the first fingerprint recognition area. Specifically, when the activation module 603 executes activation of the fingerprint recognition function in a manner in which the fingerprint recognition function of the first fingerprint recognition area is activated when the detection result is that the touch position corresponding to the touch operation is located in the first fingerprint recognition area, correspondingly, the disabling module 609 disables the fingerprint recognition function in any manner of the foregoing first to sixth manners. When the detection module 602 detects that the first user interface is displayed, the activation module 603 activates the fingerprint recognition function. Correspondingly, the disabling module 609 disables the fingerprint recognition function in the foregoing seventh manner. When the detection module 602 detects that the touch operation is to enable at least one function corresponding to any object, the activation module 603 activates the fingerprint recognition function. Correspondingly, the disabling module 609 disables the fingerprint recognition function in any manner of the foregoing first to sixth manners.

For further reducing power consumption of the mobile terminal, a third predetermined time may be set on the mobile terminal. When the first control is restarted or the first control is re-executed in the third predetermined time, the first fingerprint information does not need to be received again, that is, the user does not need to enter the fingerprint again, and therefore the fingerprint recognition function does not need to be re-activated.

Likewise, the present invention constitutes no limitation on a specific value range of the third predetermined time. Certainly, the third predetermined time may be the same as the value range of the first predetermined time and/or the second predetermined time.

Further, optionally, after the determining module 601 determines a fingerprint recognition area of a current interface, the fingerprint recognition area may further be marked, where a trigger condition of the marking is marking after the fingerprint recognition area is determined, or marking when it is detected that a finger is suspending above the fingerprint recognition area, or may further be marking after fingerprint verification fails.

According to the fingerprint recognition apparatus provided in this embodiment of the present invention, in the present invention, a determining module determines a first fingerprint recognition area of a touchscreen according to a first user interface; a detection module detects a touch operation of a user on the touchscreen; when a touch position corresponding to the touch operation of the user is located in the first fingerprint recognition area, an activation module activates a fingerprint recognition function of the first fingerprint recognition area; an obtaining module obtains corresponding first fingerprint information according to the touch operation; and when the first fingerprint information matches preset fingerprint information, the execution module executes at least one function. The fingerprint recognition apparatus implements that the fingerprint recognition function (that is, a fingerprint collection module corresponding to the fingerprint recognition function) is enabled when the touch operation entered by the user on the touchscreen is located in the first fingerprint recognition area, and then a fingerprint entered by the user is collected, thereby implementing timely fingerprint collection while reducing power consumption of the mobile terminal.

Figure 8:
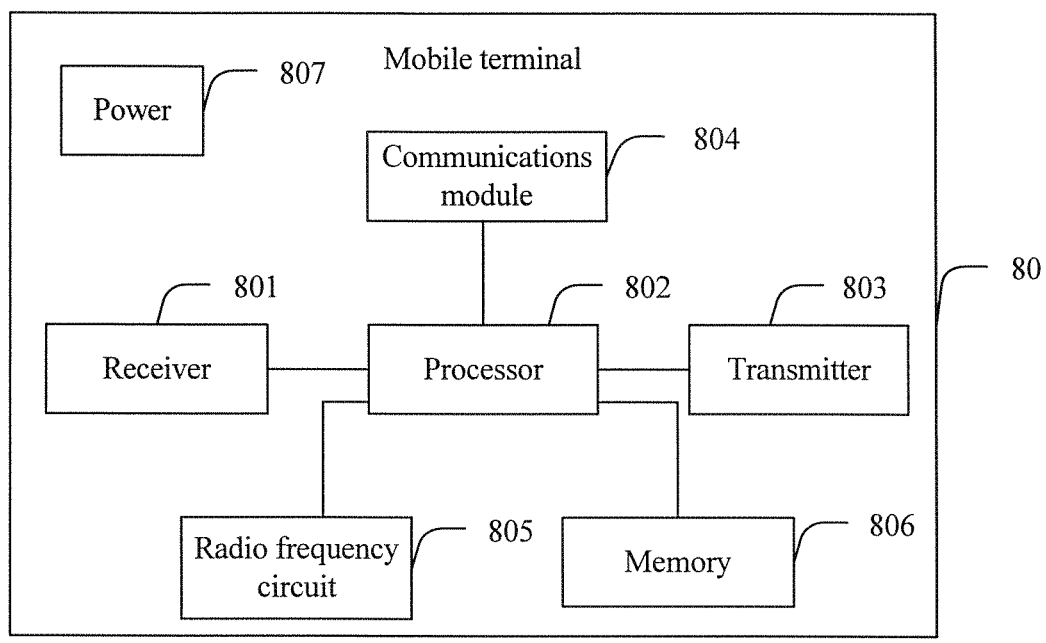
FIG. 8 is a schematic structural diagram of hardware of a mobile terminal according to an embodiment of the present invention.

With reference to the description of any one or several of the foregoing FIG. 1 to FIG. 5B, an embodiment of the present invention provides a mobile terminal 80. As shown in FIG. 8, the apparatus 80 includes: a receiver 801, a processor 802, a transmitter 803, a communications module 804, a radio frequency circuit 805, a memory 806, and a power supply 807. These components may perform communication by using one or more buses, or these components perform direct connection and communication. A person skilled in the art may understand that the structure of the mobile terminal shown in the figure does not constitute a limitation on the present invention. The structure may not only be a bus structure, but may be a star structure, and may further include more or fewer components than those shown in the figure, or combine some parts, or have different parts arrangements. In this embodiment of the present invention, the mobile terminal may be any portable mobile terminal, and includes but is not limited to a mobile phone, a mobile computer, a tablet computer, a PDA (Personal Digital Assistant, personal digital assistant), a media player, a smart television, a smart watch, smart glasses, a smart band, and the like. It should be noted that although only the foregoing modules are shown in FIG. 8, in a specific implementation process, a person skilled in the art should understand that the terminal further includes another component required for implementing normal operation.

The receiver 801 is configured to implement interaction between a user and the mobile terminal and/or information input of the user to the mobile terminal. For example, the receiver 801 may receive digit or character information entered by the user, so as to generate signal input related to user settings or function control. In a specific implementation manner of the present invention, the receiver 801 may be a touch panel, or may be another human-computer interaction interface, for example, a substantive input key and a microphone, or may be another apparatus for obtaining external information, for example, a camera. The touch panel, which is also called a touchscreen or a touchscreen, can collect an operation action of touching or approaching performed by the user on the touch panel, for example, an operation action performed by the user on the touch panel or at a position close to the touch panel by using any proper object or accessory such as a finger or a stylus, and a corresponding connecting apparatus is driven according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller; the touch controller receives the electrical signal from the touch detection apparatus, converts the electrical signal into touch point coordinates, and then transmits the touch point coordinates to the processor 802. The touch controller may further receive and execute a command delivered from the processor 802. In addition, the touch panel may be implemented in multiple types, such as a resistive type, a capacitive type, an infrared (Infrared) ray, and a surface acoustic wave. In another implementation manner of the present invention, the substantive input key used by the receiver 801 may include but is not limited to one or more of a physical keyboard, a function key (such as a volume control key or an on/off key), a trackball, a mouse, an operating lever, and the like. A receiver 801 in a form of a microphone may collect a voice that is entered by the user or an environment, and convert the voice into a command that is in an electric signal form and may be performed by the processor 802.

The processor 802 is a control center of the mobile terminal and is connected to each part of the entire mobile terminal by using various interfaces and lines. The processor 802 executes various functions of the terminal and/or processes data by running or executing a software program and/or a module that are/is stored in the memory 806, and by invoking data stored in the memory 806. The processor 802 may be formed by an IC (Integrated Circuit, integrated circuit), for example, the processor 802 may be formed by a single packaged IC, and may be formed by connecting multiple packaged ICs having same functions or different functions. For example, the processor 802 may include only a CPU (Central Processing Unit, central processing unit), and may be a combination of the CPU, a digital signal processor DSP (Digital Signal Processor, digital signal processor), a GPU (Graphic Processing Unit, graphics processing unit), and a control chip (for example, a baseband chip) in the communications module 804. In this embodiment of the present invention, the CPU may be a single computing core, and may also include multiple computing cores.

The communications module 804 is configured to set up a communication channel, so that the mobile terminal connects to a communication peer through the communication channel, and exchanges data with the communication peer through the communication channel. The communications module 804 may include a wireless communications module such as a Wireless LAN (Wireless Local Area Network, wireless local area network) module, a Bluetooth module, NFC (Near Field Communication, Near Field Communication), and a baseband (Base Band) module, and a wired communications module such as an Ethernet, a USB (Universal Serial Bus, Universal Serial Bus), and a lightning port (Lightning, which is used in devices such as iPhone 5/5s/5c by Apple). The communications module 804 is configured to perform communication between all components in the mobile terminal and the communication peer, and can support DMA (Direct Memory Access, direct memory access).

In different implementation manners of the present invention, each communications module in the communications module 804 generally appears in a form of an integrated circuit chip (Integrated Circuit Chip), and may be combined selectively without a need of including all communications modules. For example, the communications module 804 may include only a baseband chip, a radio frequency chip, and a corresponding antenna, so as to provide a communication function in a cellular communications system. The mobile terminal may connect to a cellular network (Cellular Network) or the Internet (Internet) by using a wireless communication connection set up by the communications module 804, such as wireless local network access or WCDMA access. In some optional implementation manners of the present invention, a communications module, for example, the baseband module, in the communications module 804 may be integrated into the processor 802, typically, such as APQ+MDM series platforms provided by the Qualcomm (Qualcomm) company.

The radio frequency circuit 805 is used for information receiving and sending or signal receiving and sending in a call process. For example, after receiving downlink information of a base station, the radio frequency circuit 805 sends the downlink information to the processor 802 for processing; and in addition, sends data designed for uplink to the base station as designed. Generally, the radio frequency circuit 805 includes a public circuit that is used to perform these functions, including but not limited to an antenna system, a radio frequency transceiver, one or more amplifiers, a tuner, one or more oscillators, a digital signal processor, a codec (Codec) chip set, a subscriber identity module (SIM) card, a memory, and the like. In addition, the radio frequency circuit 805 may further communicate with a network and another device by means of radio communication. The radio communication may use any communications standard or protocol, including but not limited to GSM (Global System of Mobile communication, Global System of Mobile communications), GPRS (General Packet Radio Service, General Packet Radio Service), CDMA (Code Division Multiple Access, Code Division Multiple Access), WCDMA (Wideband Code Division Multiple Access, Wideband Code Division Multiple Access), HSUPA (High Speed Uplink Packet Access, High Speed Uplink Packet Access technology), LTE (Long Term Evolution, Long Term Evolution), LTE-Advanced (LTE-Advanced), and the like.

The transmitter 803 may include but are not limited to an image output module, a voice output module, and a touch output module. The image output module is configured to output text, a picture, and/or a video. The image output module may include a display panel, for example, a display panel that is disposed in a form of an LCD (Liquid Crystal Display, liquid crystal display), an OLED (Organic Light-Emitting Diode, organic light-emitting diode), a FED (Field Emission Display, field emission display), and the like. Alternatively, the image output module may include a reflective display such as an electrophoretic (Electrophoretic) display or a display using an interferometric modulation of light (Interferometric Modulation of Light) technology. The image output module may include a single display or multiple displays of different sizes. In a specific implementation manner of the present invention, the touch panel used by the foregoing receiver 801 may be used as the display panel of the transmitter 803. For example, after detecting a gesture operation of touching or approaching on the touch panel, the touch panel transmits the gesture operation to the processor 802 to determine a type of a touch event, and then the processor 802 provides corresponding visual output on the display panel according to the type of the touch event. In FIG. 8, the receiver 801 and the transmitter 803 serve as two independent parts to implement input and output functions of the mobile device. However, in some embodiments, the touch panel and the display panel may be integrated to implement the input and output functions of the mobile terminal. For example, the image output module may display various GUIs (Graphical User Interface, graphical user interface), so as to serve as a virtual control component, and the virtual control component includes but is not limited to a window, a scrollbar, an icon, and a scrapbook, so that the user performs operations in a touch manner.

In a specific implementation manner of the present invention, the image output module includes a filter and an amplifier, which are configured to filter and amplify a video that is outputted by the processor 802. An audio output module includes a digital-analog converter, which is configured to convert an audio signal that is outputted by the processor 802 from a digital format to an analog format.

The memory 806 may be configured to store a software program and a module, that is, to store information including a program instruction. The processor 802 executes various functional applications of the mobile terminal and implements data processing by running the software program and the module that are stored in the memory 806. The memory 806 mainly includes a program storage area and a data storage area. The program storage area may store an operating system, and an application program, such as a sound playing program or an image playing program, that is required by at least one function; and the data storage area may store data (such as audio data or a phonebook) that is created according to use of the mobile terminal, and the like. In a specific implementation manner of the present invention, the memory 806 may include a volatile memory such as an NVRAM (Nonvolatile Random Access Memory, nonvolatile random access memory), a PRAM (Phase Change RAM, phase change RAM), or an MRAM (Magetoresistive RAM, magetoresistive RAM), and may further include a non-volatile memory such as at least one magnetic disk storage device, an EEPROM (Electrically Erasable Programmable Read-Only Memory, electrically erasable programmable read-only memory), or a flash memory device such as a NOR flash memory (NOR flash memory) or a NAND flash memory (NAND flash memory). The non-volatile memory stores an operating system and an application program that are executed by a processing module. The processor 802 loads, from the non-volatile memory, a running program and data to the memory, and stores digital content in a massive storage apparatus. The operating system includes various components and/or drivers that are configured to control and manage regular system tasks such as memory management, storage device control, and management of the power supply 807 and that facilitate communication between various software and hardware. In this implementation manner of the present invention, the operating system may be the Android system of Google, the iOS system developed by Apple, the Windows operating system developed by Microsoft, or the like; or may be an embedded operating system such as Vxworks.

The power supply 807 is configured to supply power to various parts of the mobile terminal to maintain their running. Generally, the power supply 807 may be a built-in battery such as a common lithium-ion battery or a nickel-hydride battery; and may also include an external power supply that directly supplies power to the mobile terminal, such as an AC adapter. In some implementation manners of the present invention, the power supply 807 may further have a broader definition. For example, the power supply 807 may further include a power management system, a charging system, a power fault detection circuit, a power converter or inverter, a power status indicator (such as a light emitting diode), and any other component that is related to power generation, management, and distribution of the mobile terminal.

The application program in the specific embodiment of the present invention includes any application installed on the mobile terminal, and includes but is not limited to a browser, an email, an instant messaging service, text processing, a virtual keyboard, a window widget (Widget), encryption, digital rights management, voice recognition, voice duplication, positioning (such as a function provided by the Global Positioning System), music playback, and the like.

With reference to the specific implementation manner of the present invention, the processor 802 is coupled with the receiver 801, the transmitter 803, the communications module 804, the radio frequency circuit 805, the memory 806, and the power supply 8, and is configured to control execution of the program instruction, and is specifically configured to: determine a first fingerprint recognition area of a touchscreen according to a first user interface, where the first fingerprint recognition area is corresponding to at least one object of the first user interface, where the at least one object is corresponding to at least one function; detect a touch operation of a user on the touchscreen; determine whether a touch position corresponding to the touch operation is located in the first fingerprint recognition area; activate a fingerprint recognition function of the first fingerprint recognition area when the touch position corresponding to the touch operation is located in the first fingerprint recognition area, and obtain corresponding first fingerprint information according to the touch operation; and execute the at least one function when the first fingerprint information matches preset fingerprint information.

The at least one object is a first control of a first application program. When the first application program is a desktop management application program, the first control is an identifier of a second application program, and the at least one function is to start the second application program. When the first application program is a non-desktop management application program, the first control is any button of the non-desktop management application program, and the at least one function is to start a function corresponding to the any button.

Further, optionally, before the processor 802 determines the first fingerprint recognition area of the touchscreen according to the first user interface, the receiver 801 is configured to receive user input, and provide the user input to the processor 802.

The user input is used to set fingerprint recognition for the at least one function corresponding to the first control.

Further, optionally, after the receiver 801 receives the user enter and provides the input to the processor 802, the processor 802 is further configured to add a specific identifier to the first control. The specific identifier is used to indicate that fingerprint recognition needs to be performed to execute the at least one function. Specifically, for an example of the specific identifier, reference may be made to any manner shown in FIG. 3(*a*) to FIG. 3(*f*).

Further, optionally, that the processor 802 determines a first fingerprint recognition area of a touchscreen according to a first user interface includes:

The processor 802 is specifically configured to determine a first fingerprint recognition area corresponding to the first control according to a first user interface of the first application program, where the first user interface is an interface that displays at least the first control.

Further, optionally, that the processor 802 determines a first fingerprint recognition area of a touchscreen according to a first user interface further includes:

The processor 802 is further configured to determine a first fingerprint recognition area corresponding to the first control according to a type of the first control, where the type is a type that requires fingerprint recognition.

Further, optionally, after the processor 802 obtains the first fingerprint information of the touchscreen, the processor 802 is further configured to verify whether the first fingerprint information matches the preset fingerprint information, and disable the fingerprint recognition function when verifying that the first fingerprint information matches the preset fingerprint information.

Further, optionally, after the processor 802 verifies whether the first fingerprint information matches the preset fingerprint information, the processor 802 is further configured to disable the fingerprint recognition function when verifying that the first fingerprint information does not match the preset fingerprint information, and no user fingerprint information is detected in a first predetermined time.

The processor 802 is further configured to disable the fingerprint recognition function when verifying that the first fingerprint information does not match the preset fingerprint information, and any user fingerprint information detected in a second predetermined time is inconsistent with the preset fingerprint information.

The processor 802 is further configured to disable the fingerprint recognition function when verifying that the first fingerprint information does not match the preset fingerprint information, and a quantity of verification errors exceeds a quantity threshold.

The processor 802 is further configured to disable the fingerprint recognition function when verifying that the first fingerprint information does not match the preset fingerprint information and detecting that the user touches a non-fingerprint recognition area, where the non-fingerprint recognition area is an area except the first fingerprint recognition area.

According to the mobile terminal provided in this embodiment of the present invention, in the present invention, a processor determines a first fingerprint recognition area of a touchscreen according to a first user interface; detects a touch operation of a user on the touchscreen; activates a fingerprint recognition function of the first fingerprint recognition area when a touch position corresponding to the touch operation of the user is located in the first fingerprint recognition area; obtains corresponding first fingerprint information according to the touch operation; and executes at least one function when the first fingerprint information matches preset fingerprint information. The mobile terminal implements that the fingerprint recognition function (that is, a fingerprint collection module corresponding to the fingerprint recognition function) is enabled when the touch operation entered by the user on the touchscreen is located in the first fingerprint recognition area, and then a fingerprint entered by the user is collected, thereby implementing timely fingerprint collection while reducing power consumption of the mobile terminal.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objects of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A fingerprint recognition method, comprising;
receiving user input on a touchscreen of a first user interface;
setting fingerprint recognition for at least one function corresponding to a first control of a first application program in response to the user input;
reading layout of the first user interface;
determining an icon position of the first control on the first user interface based on the layout of the first user interface;
determining a first fingerprint recognition area of the touchscreen on the first user interface based on the icon position of the first control;
detecting a user touch operation on the touchscreen;
determining whether a touch position corresponding to the touch operation is locate in the first fingerprint recognition area;
enabling a fingerprint recognition function of the first fingerprint recognition area when the touch position corresponding to the touch operation is located in the first fingerprint recognition area, and obtaining first fingerprint information according to the touch operation;
verifying whether the first fingerprint information matches preset fingerprint information;
disabling fingerprint recognition function upon verification that the first fingerprint information does not match the preset fingerprint information and it is detected that the user touches a non-fingerprint recognition area, wherein the non-fingerprint recognition area is an area except the first fingerprint recognition area; and
executing the at least one function when the first fingerprint information matches the preset fingerprint information.

2. The fingerprint recognition method according to claim 1, wherein determining the first fingerprint recognition area of the touchscreen according to the first user interface comprises:
determining the first fingerprint recognition area corresponding to the first control according to a type of the first control, wherein the type is a type that requires fingerprint recognition.

3. The fingerprint recognition method according to claim 1, wherein:
the first application program is a desktop management application program, the first control is an identifier of a second application program, and the at least one function is to start the second application program.

4. The fingerprint recognition method according to claim 1, wherein:
the first application program is a non-desktop management application program, the first control is any button of the non-desktop management application program, and the at least one function is to start a function corresponding to the any button.

5. The fingerprint recognition method according to claim 1, wherein after receiving user input, the method further comprises: adding a specific identifier to the first control, wherein the specific identifier is used to indicate that fingerprint recognition needs to be performed to execute the at least one function.

6. The fingerprint recognition method according to claim 1, wherein disabling the fingerprint recognition function further comprising: disabling a fingerprint collection device when the first fingerprint information does not match the preset fingerprint information, and no user fingerprint information is detected in a first predetermined time; or disabling the fingerprint collection device when the first fingerprint information does not match the preset fingerprint information, and any user fingerprint information detected in a second predetermined time is inconsistent with the preset fingerprint information.

7. A mobile terminal, comprising:
one or more processors;
a memory coupled to the one or more processors, the memory comprising instructions that, when executed by the one or more processors, cause the mobile terminal to:
receive user input on a touchscreen of a first user interface;
set fingerprint recognition for at least one function corresponding to a first control of a first application program in response to the user input;
read a layout of the first user interface;
determine an icon position of the first control on the first user interface based on the layout of the first user interface;
determine a first fingerprint recognition area of the touchscreen on the first user interface based on the icon position of the first control;
detect a user touch operation on the touchscreen;
determine whether a touch position corresponding to the touch operation is location in the first fingerprint recognition area;

enable a fingerprint recognition function of the first fingerprint recognition area when the touch position corresponding to the touch operation is located in the first fingerprint recognition area, and obtaining first fingerprint information according to the touch operation;

verify whether the first fingerprint information matches preset fingerprint information;

disable the fingerprint recognition function upon;

verification that the first fingerprint information does not match the preset fingerprint information and it is detected that the user touches a non-fingerprint recognition area, wherein the non-fingerprint recognition area is an area except the first fingerprint recognition area; and execute the at least one function when the first fingerprint information matches the preset fingerprint information.

8. The mobile terminal according to claim 7, wherein the memory comprises instructions that, when executed by the one or more processors, cause the mobile terminal to:

determine the first fingerprint recognition area corresponding to the first control according to a type of the first control, wherein the type is a type that requires fingerprint recognition.

9. The mobile terminal according to claim 7, wherein:

the first application program is a desktop management application program;

the first control is an identifier of a second application program; and the at least one function is to start the second application program.

10. The mobile terminal according to claim 7, wherein:

the first application program is a non-desktop management application program;

the first control is any button of the non-desktop management application program; and the at least one function is to start a function corresponding to the any button.

11. The mobile terminal according to claim 7, wherein the memory comprises instructions that, when executed by the one or more processors, cause the mobile terminal to: add a specific identifier to the first control, wherein the specific identifier is used to indicate that fingerprint recognition needs to be performed to execute the at least one function.

12. The mobile terminal according to claim 7, wherein the memory comprises instructions that, when executed by the one or more processors, cause the mobile terminal to:

disable a fingerprint collection device when the first fingerprint information does not match the preset fingerprint information, and no user fingerprint information is detected in a first predetermined time; or disable the fingerprint collection device when the first fingerprint information does not match the preset fingerprint information, and any user fingerprint information detected in a second predetermined time is inconsistent with the preset fingerprint information; or disable the fingerprint collection device when the first fingerprint information does not match the preset fingerprint information and it is detected that the user touches a non-fingerprint recognition area, wherein the non-fingerprint recognition area is an area except the first fingerprint recognition area.

* * * * *